(12) United States Patent
Shimizu et al.

(10) Patent No.: US 8,081,943 B2
(45) Date of Patent: *Dec. 20, 2011

(54) RECEPTION APPARATUS AND RECEPTION METHOD

(75) Inventors: Yoshito Shimizu, Kanagawa (JP); Takeaki Watanabe, Kyoto (JP); Noriaki Saito, Tokyo (JP)

(73) Assignee: Panasonic Corporation, Osaka (JP)

( * ) Notice: Subject to any disclaimer, the term of this patent is extended or adjusted under 35 U.S.C. 154(b) by 520 days.

This patent is subject to a terminal disclaimer.

(21) Appl. No.: 12/276,047

(22) Filed: Nov. 21, 2008

(65) Prior Publication Data

US 2009/0080571 A1 Mar. 26, 2009

Related U.S. Application Data

(63) Continuation of application No. 10/581,451, filed as application No. PCT/JP2004/017784 on Nov. 30, 2004, now Pat. No. 7,477,882.

(30) Foreign Application Priority Data

Dec. 1, 2003 (JP) ................................. 2003-402231

(51) Int. Cl.
*H04B 1/06* (2006.01)
*H04B 7/00* (2006.01)

(52) U.S. Cl. ............... 455/244.1; 455/242.1; 455/232.1; 455/253.1

(58) Field of Classification Search ............... 455/244.1, 455/241.1, 232.1, 253.1, 130, 226.1, 227, 455/230, 231, 234.2, 240.1, 242.1–242.2, 455/245.1, 252.1, 307, 333–334, 341

See application file for complete search history.

(56) References Cited

U.S. PATENT DOCUMENTS 6,463,266 B1 10/2002 Shohara
(Continued)

FOREIGN PATENT DOCUMENTS

EP 1102413 5/2001
(Continued)

OTHER PUBLICATIONS

English Language Abstract of JP 2003-298451.
(Continued)

*Primary Examiner* — Pablo Tran
(74) *Attorney, Agent, or Firm* — Greenblum & Bernstein, P.L.C.

(57) ABSTRACT

A receiving apparatus includes an amplification section that amplifies a received signal and a frequency conversion section that converts a frequency of the received signal, from a radio frequency to a baseband, the baseband having a lower frequency than the radio frequency. A gain control section amplifies, by a predetermined gain, the signal that has been subjected to the frequency conversion to the baseband. A voltage calibration section performs calibration on an offset voltage generated in the signal subjected to frequency conversion to the baseband. A time constant control section sets a first time constant during a reception operation and sets a second time constant, which is reduced with respect to the first time constant, during the calibration. A filter section passes a received signal of a predetermined band, with the first time constant or the second time constant, an operation control section stops operation of the amplification section during the calibration, controls the amplification section to operate during the reception operation, and controls the operation of the amplification section so as to reduce a residual offset voltage caused by switching the operation of the amplification section.

7 Claims, 11 Drawing Sheets

U.S. PATENT DOCUMENTS

| | | |
|---|---|---|
| 6,826,388 B1 | 11/2004 | Tanaka et al. |
| 2004/0157573 A1 | 8/2004 | Lee et al. |
| 2005/0186920 A1 | 8/2005 | Staszewski et al. |
| 2006/0240779 A1 | 10/2006 | Rostami et al. |
| 2007/0129031 A1* | 6/2007 | Newton et al. ............ 455/127.2 |
| 2009/0017774 A1* | 1/2009 | Shen et al. .................... 455/73 |
| 2009/0042526 A1* | 2/2009 | Maulik et al. ............. 455/234.1 |
| 2010/0041353 A1* | 2/2010 | Alford et al. .............. 455/115.1 |
| 2010/0173598 A1* | 7/2010 | Kavadias et al. .......... 455/226.1 |
| 2010/0273431 A1* | 10/2010 | Fraser et al. ............. 455/67.11 |
| 2010/0322288 A1* | 12/2010 | Kawano ...................... 375/136 |
| 2010/0322345 A1* | 12/2010 | Plevridis .................... 375/296 |
| 2011/0007780 A1* | 1/2011 | Shimoni ..................... 375/136 |
| 2011/0051791 A1* | 3/2011 | Hammerschmidt et al. .. 375/226 |
| 2011/0053529 A1* | 3/2011 | Furuya et al. ............. 455/114.2 |

FOREIGN PATENT DOCUMENTS

| | | |
|---|---|---|
| JP | 2000-092143 | 3/2000 |
| JP | 2001-211098 | 8/2001 |
| JP | 2001-245007 | 9/2001 |
| JP | 2002-217769 | 8/2002 |
| JP | 2003-298451 | 10/2003 |

OTHER PUBLICATIONS

English Language Abstract of JP 2001-211098.
English Language Abstract of JP 2001-245007.
English Language Abstract of JP 2002-217769.
English Language Abstract of JP 2000-0921143.

* cited by examiner

RECEPTION APPARATUS AND RECEPTION METHOD

CROSS REFERENCE TO RELATED APPLICATION

This application is a continuation of pending U.S. patent application Ser. No. 10/581,451, filed Jun. 1, 2006, which is a National Stage of PCT/JP04/017784, filed Nov. 30, 2004, which is based upon Japanese Application No. 2003-402231, filed Dec. 1, 2003 the disclosures of which are expressly incorporated herein by reference in their entireties. The International application is not published in English.

TECHNICAL FIELD

The present invention relates to a reception apparatus and reception method, and more particularly, to a reception apparatus and reception method for calibrating an offset voltage of a received signal.

BACKGROUND ART

In recent years, as a means of realizing a smaller and multiband radio terminal at lower cost, a direct conversion reception scheme is becoming a focus of attention and a portable terminal mounted with a direct conversion reception apparatus is becoming the mainstream.

However, a widely known disadvantage of the direct conversion reception apparatus is a DC offset voltage (hereinafter "offset voltage"). That is, in the low-frequency part of the baseband frequency band after an quadrature demodulator, it is not possible to implement capacity coupling given the stabilization time after start-up of a receiver, and therefore an offset voltage of the quadrature demodulator output which is produced due to the fact that the local oscillating frequency at an input terminal of the quadrature demodulator and the input signal frequency are identical, is output multiplied by a gain of the low-frequency part, which causes circuit saturation in the low-frequency part and degradation of reception sensitivity.

Conventionally, there is an offset voltage calibration scheme, whereby an offset voltage calibration start signal is received from a digital signal processing section, the time constant of a low pass filter constituting an analog baseband circuit (low-frequency part) is reduced so as to realize high accuracy and high speed of offset voltage calibration at the same time (for example, see Patent Document 1).

FIG. 1 shows conventional reception apparatus 10. In FIG. 1, reception apparatus 10 is constructed of: variable gain amplifier 11; offset voltage calibration circuit 12 for variable gain amplifier 11; low pass filter 13; resistors 14 and capacitor 15 constituting low pass filter 13; switches 16 that separate capacitor 15 from signal wiring; analog baseband circuit 17 composed of variable gain amplifier 11 and low pass filter 13; digital signal processing section 18 that converts a signal received from analog base band circuit 17 to an audio signal or data signal and transmits an offset voltage calibration start signal to offset voltage calibration circuit 12; low noise amplifier 19; quadrature demodulator 20; and decoder 21.

A high-frequency signal received by an antenna (not shown) is amplified by low noise amplifier 19 and then distributed to two routes. A carrier having substantially the same frequency as the above high-frequency signal is supplied from a local oscillator (not shown). The above carrier, which is divided into two signals having a phase difference of 90 degrees by a phase shifter and the above high-frequency signal are mixed by quadrature demodulator 20 and frequency-converted to a baseband frequency band. The baseband signal is amplified by variable gain amplifier 11 and frequency-selected by low pass filter 13 and output to digital signal processing section 18.

When triggered by the offset voltage calibration start signal transmitted from digital signal processing section 18, this reception apparatus 10 opens switch 16 and starts the operation of offset voltage calibration circuit 12.

Furthermore, there is another conventional offset voltage calibration scheme, whereby a high-frequency block is always kept in a non-operating state during the offset voltage calibration operation and improves resistance against interferer (for example, see Patent Document 2).

FIG. 2 shows conventional reception apparatus 30. In FIG. 2, reception apparatus 30 is constructed of: antenna 31; low noise amplifier 32; local oscillators 33, 36 43; mixers 34, 37, 41, 42; bandpass filters 35, 39; switch 38; variable gain amplifier 40; phase shifter 44; A/D converters 45, 46, 50; offset voltage calibration circuits 47, 48; log amplifier 49; carrier detection circuit 51; and control circuit 52.

A high-frequency signal received by antenna 31 is amplified by low noise amplifier 32 and then converted to a first intermediate frequency by local oscillator 33, mixer 34 and band pass filter 35. The signal is further converted to a second intermediate frequency by local oscillator 36, mixer 37, bandpass filter 39 and then distributed to two routes through variable gain amplifier 40. The signal is then mixed with a carrier having substantially the same frequency as the second intermediate frequency supplied from local oscillator 43 at mixers 41, 42 and frequency-converted to a baseband frequency band.

In such reception apparatus 30, control circuit 52 generates control signals for switch 38, offset voltage calibration circuits 47, 48, based on a frame synchronizing signal output from a digital signal processing section (not shown). During the offset voltage calibration operation by offset voltage calibration circuits 47, 48, switch 38 is open so that mixer 37 is in a non-operating state and the leakage of interferer to mixer 37 and subsequent circuitry is reduced.

Furthermore, there is yet another conventional offset voltage calibration scheme, whereby a high-frequency block is kept in a non-operating state during the offset voltage calibration operation, thereby improving resistance against interferer, and whereby an impedance compensation circuit is provided additionally to suppress the residual offset voltage produced due to the fact that the high-frequency block operating state differs between the time of calibration operation and the time of reception operation (see, for example, Patent Document 3).

FIG. 3 shows conventional reception apparatus 60.

In FIG. 3, reception apparatus 60 is constructed of: high-frequency block 61; power supply 62 for high-frequency block 61; baseband signal processing block 63; quadrature demodulator 64; impedance compensation block 65; antenna 66; first local oscillator 67; phase shifter 68; second local oscillator 69; quadrature modulator 70; phase shifter 71; third local oscillator 72; offset voltage detection block 73; offset voltage calibration control block 74; bandpass filter 75; limiter amplifier 76; and demodulator 77.

During the offset voltage calibration operation of baseband signal processing block 63, bias supply from power supply 62 to high-frequency block 61 is stopped, so that high-frequency block 61 is in a non-operating state to reduce and the leakage of interferer to subsequent circuitry is reduced. After the offset voltage calibration operation is completed, a bias is supplied from power supply 62 to high-frequency block 61 to set high-frequency block 61 in an operating state, and therefore the output impedance of high-frequency block 61 fluctuates compared to the time of calibration operation. Meanwhile, the amount of local oscillation signal leaked to the input terminal of quadrature demodulator 64 and then reflected toward quadrature demodulator 64 changes, and the fluctuation of the offset voltage at the output terminal of quadrature demodulator 64, that is, the residual offset voltage caused by the variation in the amount of mixing, is generated. This conventional example is intended to stabilize the output impedance of high-frequency block 61 which differs between the time of calibration operation and the time of reception operation, and suppresses the above residual offset voltage by connecting impedance compensation block 65 between high-frequency block 61 and quadrature demodulator 64.

Furthermore, there is still another conventional offset voltage calibration scheme, whereby in order to restrain the residual offset voltage caused by the difference in the operating state of a high-frequency block between the time of calibration operation and the time of reception operation, a dummy circuit having the same circuit configuration as a low noise amplifier is provided additionally, one of the circuits is set in an operating state and the other circuit is set in a non-operating state during both the time of calibration operation and the time of reception operation, and the reflection coefficient between the low noise amplifier and the quadrature demodulator is thereby stabilized (see, for example, Patent Document 4).

FIG. 4 shows conventional reception apparatus 80. In FIG. 4, reception apparatus 80 is constructed of: low noise amplifier 81 that amplifies a received signal; dummy low noise amplifier (hereinafter "dummy LNA") 82 that separates an input terminal from an outside terminal to which a received signal is input; antenna 83; bandpass filter 84; reference current generation circuit 85; and quadrature demodulator 86 that implements frequency transformation to a baseband frequency band.

Low noise amplifier 81 is set in a non-operating state during the offset voltage calibration operation and low noise amplifier 81 is in an operating state during the reception operation after the calibration operation is completed, and resistance to interferer during the calibration operation is thereby improved. Here, in order to stabilize the output impedance of low noise amplifier 81 that differs between the time of calibration operation and the time of reception operation, the output terminal of dummy LNA 82 is connected to a connection midpoint between the output terminal of low noise amplifier 81 and the input terminal of quadrature demodulator 86 and the next operation switching is performed. That is, the residual offset voltage is suppressed by setting low noise amplifier 81 in a non-operating state and dummy LNA 82 in an operating state during the calibration operation, while setting low noise amplifier 81 in an operating state and dummy LNA 82 in a non-operating state during the reception operation.

Here, restraining the degradation in reception sensitivity requires highly accurate offset voltage calibration. Furthermore, the basic operation (operating mode) of the reception apparatus shifts from an idle mode (standby mode), to a start-up mode of starting a reference current circuit and a local oscillator of each reception section, and then, after a gain setting is performed by again setting section and an offset voltage calibration operation is carried out, shifts to a reception mode and finally returns to an idle mode. If the offset voltage calibration operation can be realized fast, it is possible to shorten the operation time of the reception apparatus—that is, extend the standby time. Therefore, the offset voltage needs to be calibrated fast. On the other hand, when a filter with a large time constant exists in a feedback loop of the calibration circuit, delay is produced in the filter section, making it difficult to implement high-speed calibration.

Patent Document 1: Japanese Patent Application Laid-Open No. 2001-211098
Patent Document 2: Japanese Patent Application Laid-Open No. 2000-92143
Patent Document 3: Japanese Patent Application Laid-Open No. 2001-245007
Patent Document 4: Japanese Patent Application Laid-Open No. 2002-217769

DISCLOSURE OF INVENTION

Problems to be Solved by the Invention

However, in the case of FIG. 1, the conventional apparatus reduces the time constant of low pass filter 13 during the offset voltage calibration operation, so that it is possible to make the offset voltage calibration operation fast. However, since the attenuation of interferer at low pass filter 13 cannot be anticipated, there is a problem that analog baseband circuit 17 is saturated and reception sensitivity degrades.

Furthermore, in the case of FIG. 2, the conventional apparatus attenuates interferer using a forward separation operation in a non-operating state of mixer 37, so that it is possible to improve resistance to interferer. However, since the operating state of mixer 37 differs between the time of reception operation and the time of offset voltage calibration, there is a problem of producing a residual offset voltage.

Furthermore, in the case of FIG. 3, the conventional apparatus attenuates interferer using a forward separation operation in a non-operating state of high-frequency block 61 during offset voltage calibration, and therefore it is possible to improve resistance to interferer, and, by adding impedance compensation block 65, reduce the residual offset caused by the operating state of high-frequency block 61, which differs between the reception operation time and offset voltage calibration time. However, because it adds circuitry that is not indispensable to the reception operation, there is a problem of causing noise characteristic degradation at the receiver.

Furthermore, in the case of FIG. 4, the conventional apparatus attenuates interferer using a forward separation operation in a non-operating state of low noise amplifier 81 during the offset voltage calibration operation, and therefore it is possible to improve resistance to interferer and it is possible to reduce the remaining offset caused by the operating state of low noise amplifier 81 which differs between the reception operation time and offset voltage calibration operation time using dummy LNA 82. However, because it adds circuitry that is not indispensable to the reception operation, there is a problem that the noise characteristic of the receiver degrades. Furthermore, because the input terminal of dummy LNA 82 is separated from the outside terminal to which the received signal is input, there is a problem that it is not possible to completely calibrate the residual offset voltage caused by the reflected signal of a local oscillation signal leaked out of the semiconductor integrated circuit.

It is therefore an object of the present invention to provide a reception apparatus and reception method whereby offset voltage calibration can be carried out fast and with high accuracy even in an environment in which interferer exist, without causing degradation of noise characteristics.

Means for Solving the Problem

The reception apparatus according to the present invention comprises an amplification section that carries out processing of amplifying a received signal, a frequency conversion section that carries out processing of converting the frequency of the received signal amplified by the amplification section from a radio frequency to a baseband which is a lower frequency than the radio frequency, a gain control section that amplifies the received signal whose frequency has been converted by the frequency conversion section at a predetermined gain in divided stages of a first stage and a second stage, a voltage calibration section that performs calibration processing on an offset voltage of the received signal generated in the first stage and the second stage during the amplification by the gain control section in order from the first stage to the second stage, a filter section that lets pass the received signal in a predetermined band with any one of a first time constant and a second time constant which is reduced from the first time constant in each of the stages, a time constant control section that sets the time constant of the filter section as the second time constant before the calibration processing for each stage of the calibration processing and changes the time constant of the filter section included in the stage in which the calibration processing is completed in order from the second time constant to the first time constant, and an operation control section that stops the operation of the amplification section or the frequency conversion section during the calibration processing in the first stage and causes the amplification section or the frequency conversion section to operate after the calibration processing in the first stage is completed and before the calibration processing in the second stage.

The reception method of the present invention comprises a step of performing processing of amplifying a received signal, a step of performing processing of converting the frequency of an amplified received signal from a radio frequency to a baseband which is a lower frequency than the radio frequency, a step of performing gain control with such a gain that the received signal whose frequency has been converted has predetermined reception quality, a step of performing calibration processing on an offset voltage of the received signal generated during gain control, a step of setting a first time constant during a reception operation and sets a second time constant which is reduced from the first time constant during calibration processing, a step of letting pass the received signal of a predetermined band with the set first time constant or the second time constant, and a step of stopping the operation of amplifying the received signal or the operation of frequency conversion of the received signal during the calibration processing and controlling the operation of the amplification processing or operation of performing frequency conversion so as to reduce the offset voltage caused by the switching of the operation of amplifying the received signal or the operation of performing frequency conversion of the received signal.

The semiconductor integrated circuit apparatus of the present invention comprises an amplification circuit that performs processing of amplifying a received signal, a frequency conversion circuit that performs processing of converting the frequency of the received signal amplified by the amplification circuit from a radio frequency to a baseband which is a lower frequency than the radio frequency, a gain control circuit that performs gain control with such a gain that the received signal whose frequency has been converted by the frequency conversion circuit has predetermined reception quality, a voltage calibration circuit that performs calibration processing at an offset voltage of the received signal generated during gain control by the gain control circuit, a time constant control circuit that sets a first time constant during a reception operation and sets a second time constant which is reduced from the first time constant when the voltage calibration circuit carries out the calibration processing, a filter circuit that lets pass the received signal of a predetermined band with the first time constant or the second time constant set by the time constant control circuit, and an operation control circuit that stops the operation of the amplification circuit that amplifies the received signal or the frequency conversion circuit that performs the frequency conversion of the received signal during the calibration processing and controls the operation of the amplification circuit or the frequency conversion circuit so as to reduce the offset voltage caused by stopping the operation of the amplification circuit or the frequency conversion circuit.

Advantageous Effect of the Invention

According to the present invention, it is possible to perform offset voltage calibration fast and with high accuracy even in an environment in which interferer exist, without causing degradation of noise characteristics.

BEST MODE FOR CARRYING OUT THE INVENTION

Now, embodiments of the present invention will be described in detail with reference to the accompanying drawings.

Embodiment 1

Figure 1:
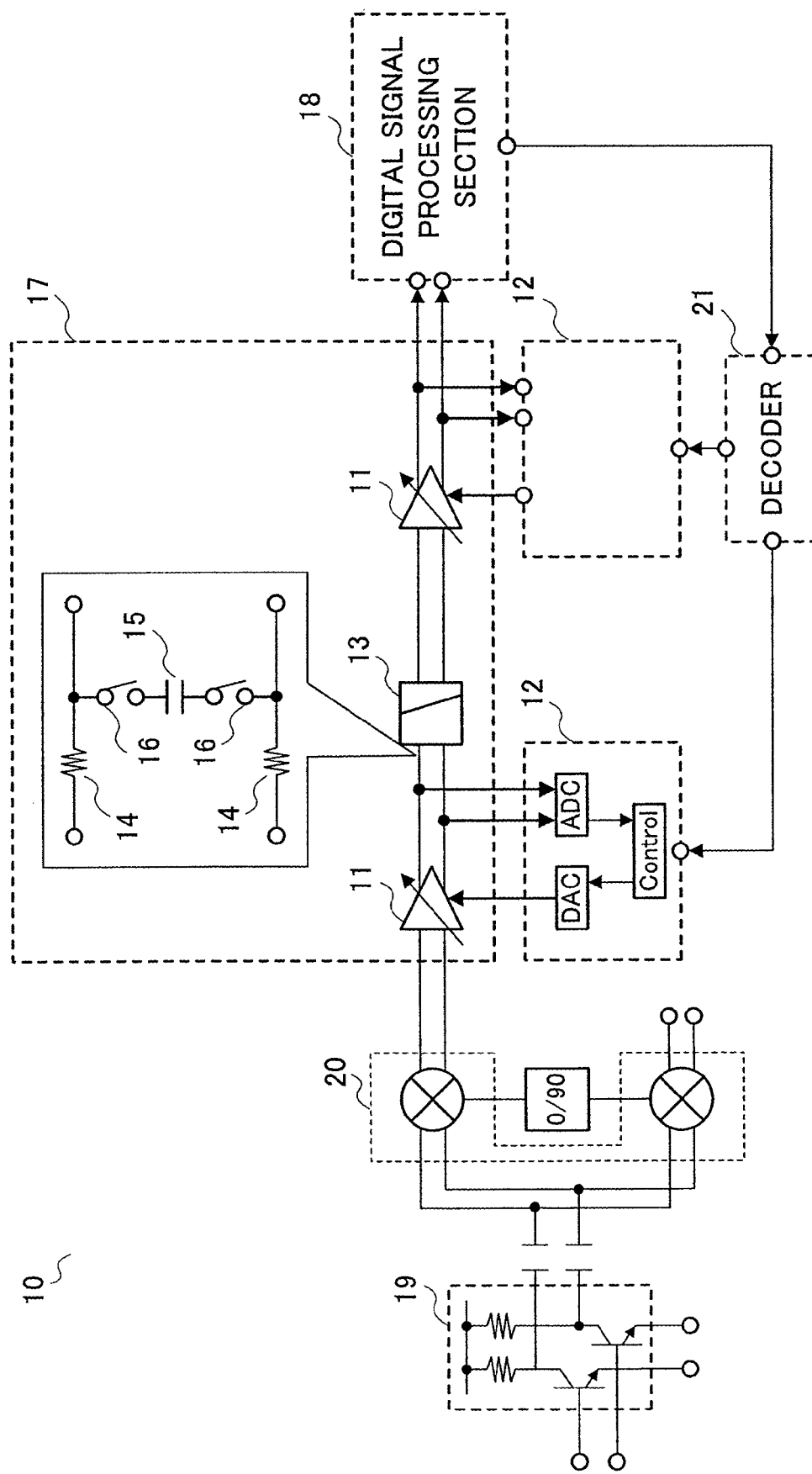
FIG. 1 is a block diagram showing the configuration of a conventional reception apparatus.
Figure 2:
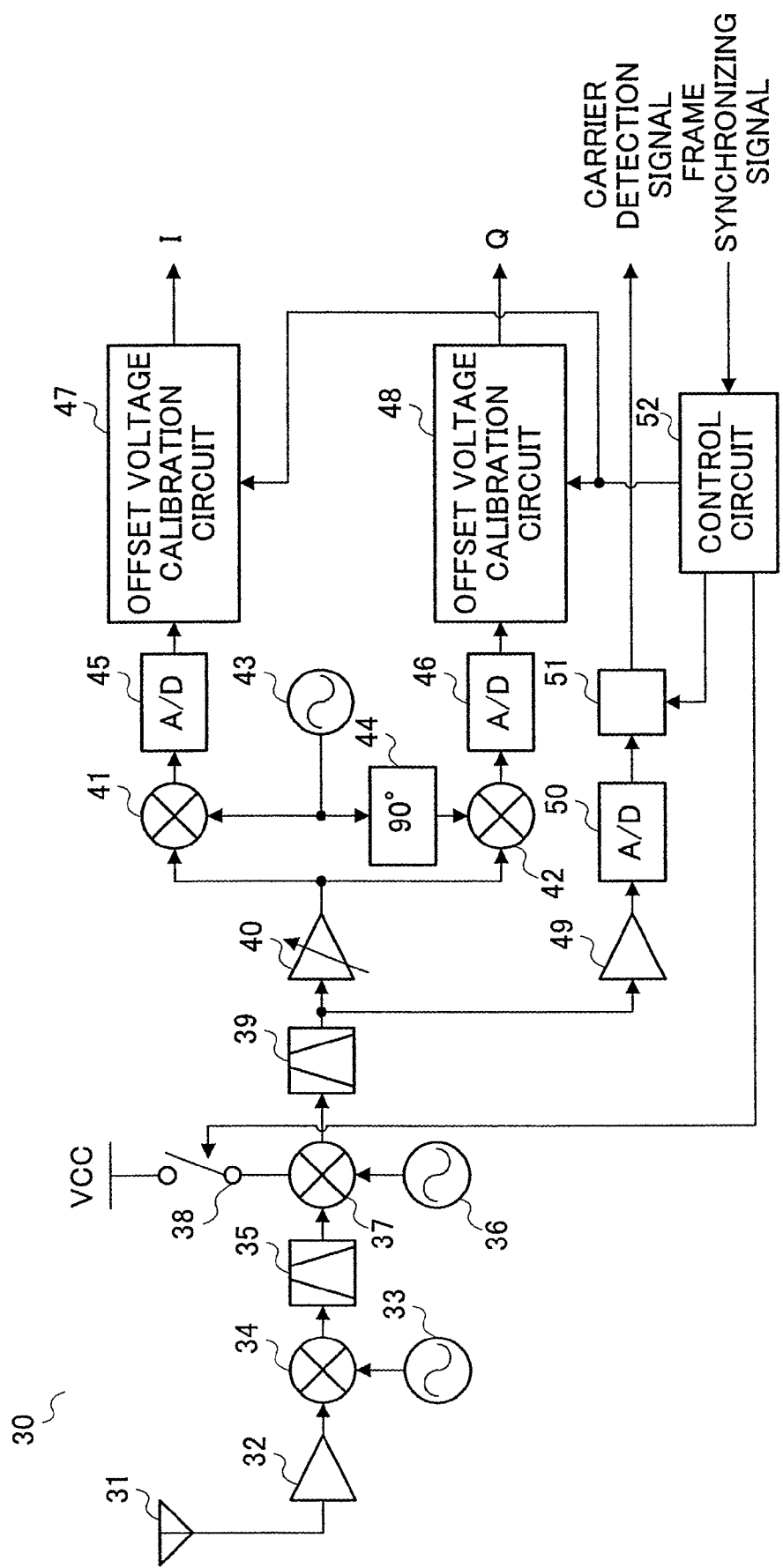
FIG. 2 is a block diagram showing the configuration of a conventional reception apparatus.
Figure 3:
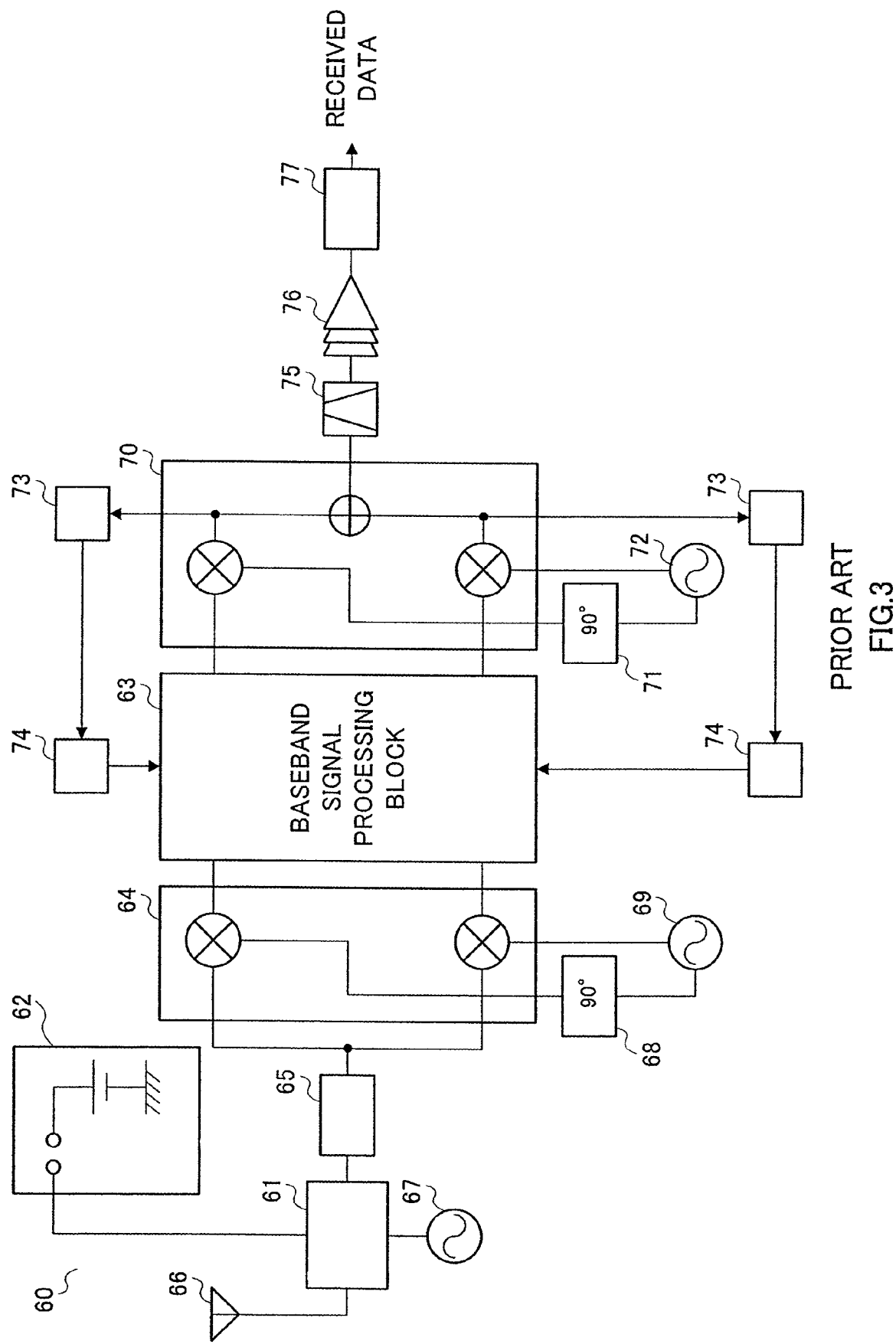
FIG. 3 is a block diagram showing the configuration of a conventional reception apparatus.
Figure 4:
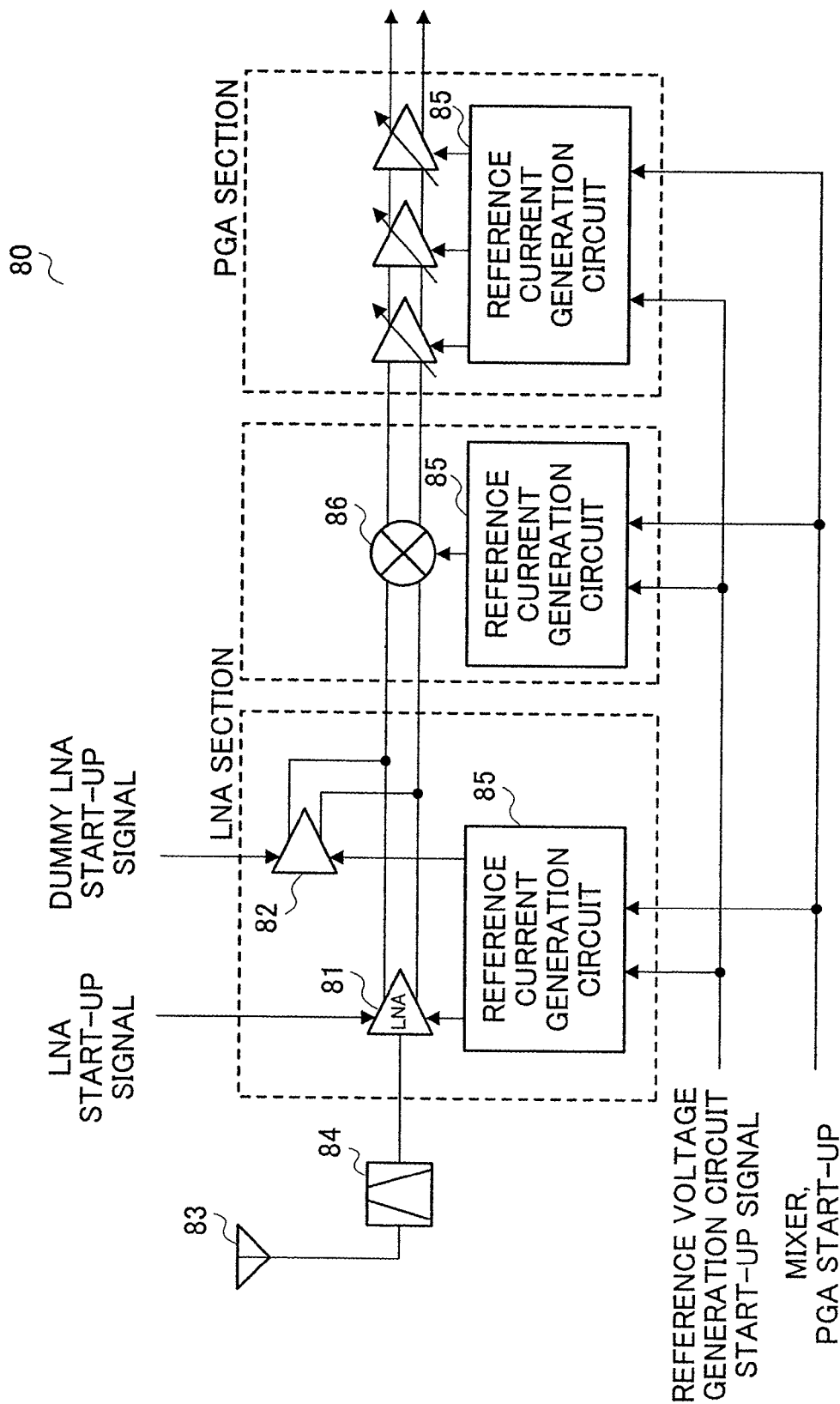
FIG. 4 is a block diagram showing the configuration of a conventional reception apparatus.
Figure 5:
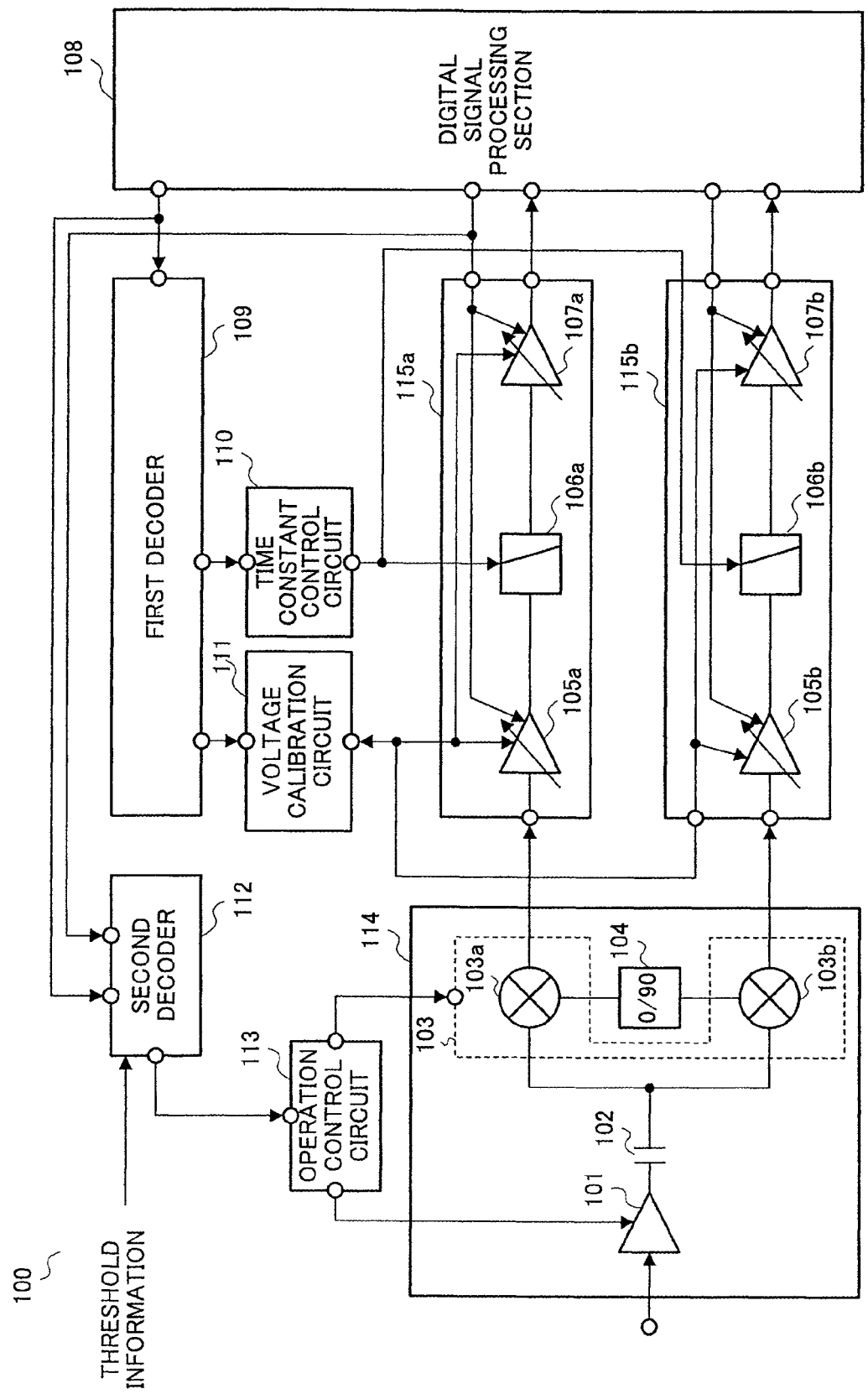
FIG. 5 is a block diagram showing the configuration of a reception apparatus according to Embodiment 1 of the present invention.

FIG. 5 is a block diagram showing the configuration of reception apparatus 100 according to of Embodiment 1 of the present invention. Low noise amplifier 101, capacitor 102, quadrature demodulator 103 and phase shifter 104 constitute high-frequency circuit 114. Variable gain amplifier 105a, low pass filter 106a and variable gain amplifier 107a constitute analog baseband circuit 115a. Furthermore, variable gain amplifier 105b, low pass filter 106b and variable gain amplifier 107b constitute analog baseband circuit 115b. Furthermore, mixer 103a and mixer 103b constitute quadrature demodulator 103, which is a demodulation section.

Low noise amplifier 101 amplifies a received signal and outputs the result to mixer 103a and mixer 103b of quadrature demodulator 103 through capacitor 102. Furthermore, low noise amplifier 101 is in an operating state for amplifying the received signal or in a non-operating state for suppressing the received signal, depending on the control of operation control circuit 113 during the offset voltage calibration operation.

Mixer 103a converts the frequency of the received signal input from low noise amplifier 101 through capacitor 102 from a radio frequency to a baseband, and outputs the result to variable gain amplifier 105a of analog baseband circuit 114a. Furthermore, mixer 103a is in an operating state for converting the frequency of the received signal from a radio frequency to a baseband or in a non-operating state for suppressing the received signal and stopping the processing of converting the frequency of the received signal from a radio frequency to a baseband, depending on the control of operation control circuit 113 during the offset voltage calibration operation.

Mixer 103b converts the frequency of the received signal input from low noise amplifier 101 through capacitor 102 from a radio frequency to a baseband, and outputs the result to variable gain amplifier 105b of analog baseband circuit 114b. Furthermore, mixer 103b is in an operating state for converting the frequency of the received signal from a radio frequency to a baseband or in a non-operating state for suppressing the received signal and stopping the processing of converting the frequency of the received signal from a radio frequency to a baseband, depending on the control of operation control circuit 113 during offset voltage calibration. When mixers 103a, 103b are in an operating state, quadrature demodulator 103 is also in an operating state. When mixers 103a, 103b are in a non-operating state, quadrature demodulator 103 is also in a non-operating state.

Phase shifter 104 generates two signals having a phase difference of 90 degrees from each other from the local oscillation signal that is input from a local oscillation source (not shown), and outputs the signals to mixer 103a and mixer 103b of quadrature demodulator 103, respectively.

Variable gain amplifier 105a is a gain control section and calibrates the offset voltage of the received signal input from mixer 103a based on the control of voltage calibration circuit 111. Furthermore, variable gain amplifier 105a amplifies the received signal input from mixer 103a by a predetermined gain according to an instruction from digital signal processing section 108, and outputs the amplified signal to low pass filter 106a.

Variable gain amplifier 105b is a gain control section and calibrates the offset voltage of the received signal input from mixer 103b based on the control of voltage calibration circuit 111. Furthermore, variable gain amplifier 105b amplifies the received signal input from mixer 103b by predetermined gain according to an instruction from digital signal processing section 108, and outputs the amplified signal to low pass filter 106b.

Low pass filter 106a is a filter section that lets pass only predetermined low frequency of the received signal that is input from variable gain amplifier 105a based on the control of time constant control circuit 110, and thereby eliminates unnecessary components such as interferer, and outputs the result to variable gain amplifier 107a.

Low pass filter 106b is a filter section and lets pass only predetermined low frequency of the received signal that is input from variable gain amplifier 105b based on the control of time constant control circuit 110, and thereby eliminates an unnecessary components such as interferer, and outputs the result to variable gain amplifier 107b.

Variable gain amplifier 107a is a gain control section and calibrates the offset voltage of the received signal input from low pass filter 106a based on the control of voltage calibration circuit 111. Furthermore, variable gain amplifier 107a amplifies the received signal input from low pass filter 106a by a predetermined gain according to an instruction from digital signal processing section 108, and output the amplified signal to digital signal processing section 108.

Variable gain amplifier 107b is a gain control section and calibrates the offset voltage of the received signal input from low pass filter 106b based on the control of voltage calibration circuit 111. Furthermore, variable gain amplifier 107b amplifies the received signal input from low pass filter 106b by a predetermined gain according to an instruction from digital signal processing section 108 and output the amplified signal to digital signal processing section 108.

Digital signal processing section 108 is a gain setting section and recovers the data signal from the received signal input from variable gain amplifier 107a and variable gain amplifier 107b, and displays data on a display section (not shown) or performs audio output to a speaker (not shown). Furthermore, digital signal processing section 108 sets such a gain that the received signals input from variable gain amplifier 107a and variable gain amplifier 107b satisfy predetermined reception quality, controls variable gain amplifier 105a, variable gain amplifier 105b, variable gain amplifier 107a and variable gain amplifier 107b so that the received signal has the set gain, and outputs gain information, which is information about the set gain, to second decoder 112. Furthermore, digital signal processing section 108 outputs a control start signal, which indicates the start of the offset voltage calibration of the received signal at a predetermined time, to first decoder 109 and second decoder 112.

When a control start signal is input from digital signal processing section 108, first decoder 109 outputs a calibration start signal to voltage calibration circuit 111 to start the offset voltage calibration operation of the received signal and outputs a time constant control start signal, which instructs time constant control circuit 110 to perform operation, to time constant control circuit 110.

Time constant control circuit 110 is a time constant control section and controls the time constant to be set in low pass filter 106a and low pass filter 106b based on the time constant control start signal input from first decoder 109.

When a control start signal is input from first decoder 109, voltage calibration circuit 111 controls variable gain amplifier 105a, variable gain amplifier 105b, variable gain amplifier 107a and variable gain amplifier 107b to start the offset voltage calibration operation of the received signal.

When a control start signal is input from digital signal processing section 108, second decoder 112 compares the gain in gain information input from digital signal processing section 108 with a threshold (first threshold). Then, when the set gain is equal to or above the threshold, second decoder 112 outputs an operation control start signal for stopping the operation of low noise amplifier 101 or quadrature demodulator 103 to operation control circuit 113, and, when the set gain is less than the threshold, second decoder 112 outputs an operation control start signal not stopping the operation of low noise amplifier 101 and quadrature demodulator 103, to operation control circuit 113.

When an operation control start signal stopping the operation of low noise amplifier 101 or quadrature demodulator 103 is input from second decoder 112, operation control circuit 113 performs such control as to stop the operation of low noise amplifier 101 or quadrature demodulator 103. When an operation control start signal not stopping the operation of low noise amplifier 101 or quadrature demodulator 103 is input from second decoder 112, operation control circuit 113 performs no control over low noise amplifier 101 and quadrature demodulator 103.

Figure 6:
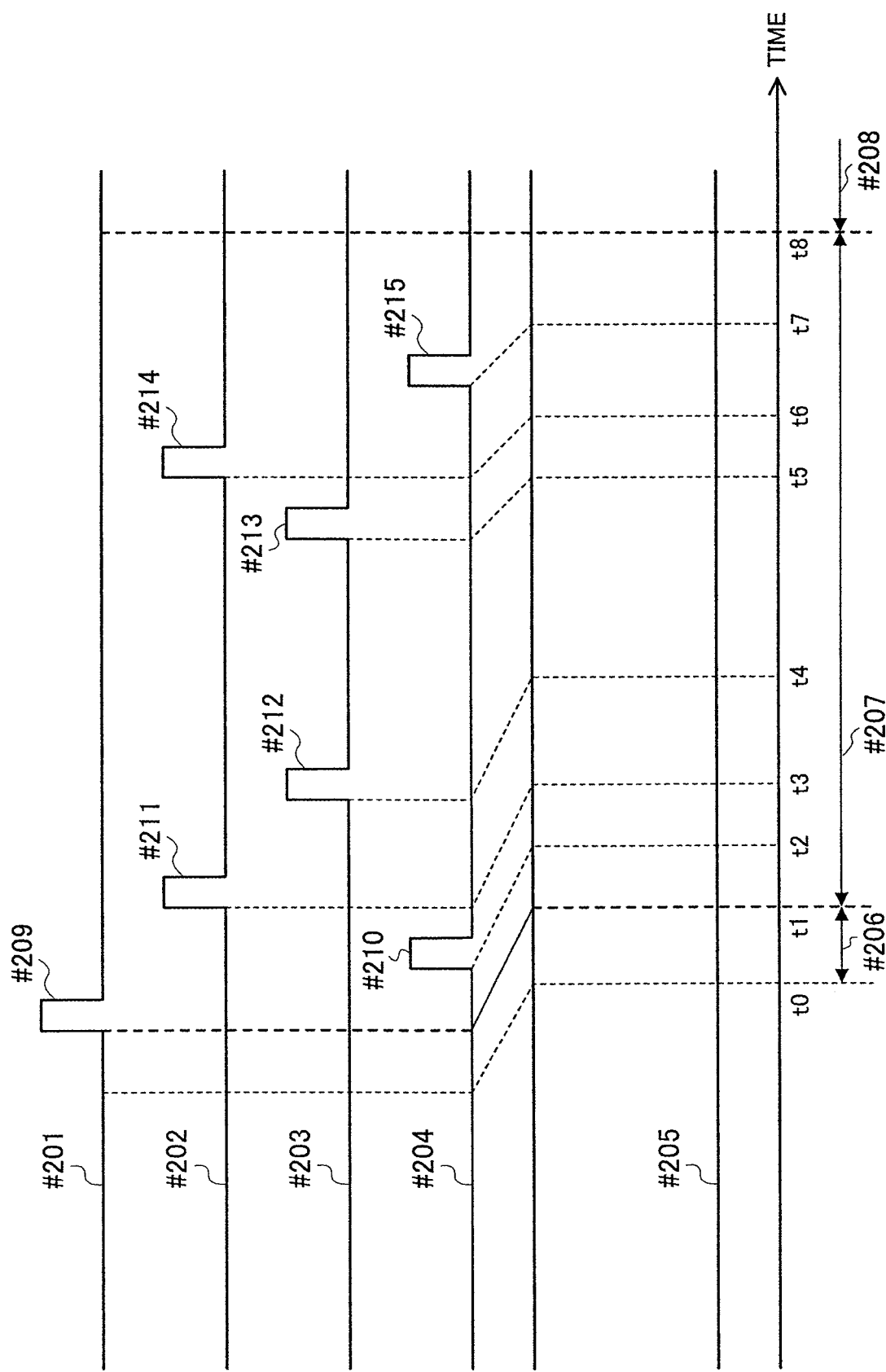
FIG. 6 is a flow chart showing the operation of the reception apparatus according to Embodiment 1 of the present invention.

Next, the operation of reception apparatus 100 will be explained using FIG. 6. FIG. 6 shows a time chart of the control operation by reception apparatus 100. FIG. 6 shows time waveform #201 of a control start signal which is output from digital signal processing section 108, time waveform #202 of a time constant control start signal which is output from first decoder 109, time waveform #203 of a calibration start signal which is output from first decoder 109, time waveform #204 of an operation control start signal which is output from second decoder 112 when the set gain is equal to or above a threshold and time waveform #205 of an operation control start signal which is output from second decoder 112 when the set gain is less than the threshold. Furthermore, in FIG. 6, time t0 time t1 is start-up mode period #206 of reception apparatus 100, time t1 to time t8 is offset voltage calibration period #207 which is the period during which an offset voltage calibration operation of received signal 100 is performed and the period from time t8 onward is reception mode period #208.

Control start signal #209 is output from digital signal processing section 108 at time t1 after start-up mode period #206 of reception apparatus 100, which becomes a trigger to start offset voltage calibration period #207.

When the set gain is equal to or above the threshold, second decoder 112 that has received a control start signal outputs operation control start signal #210 at time t2. Operation control circuit 113 receiving operation control start signal #210 for the first time sets low noise amplifier 101 or quadrature demodulator 103 constituting high-frequency circuit 114 in a non-operating state and reduces the leakage of interferer. First decoder 109 that receiving a control start signal simultaneously with second decoder 112 next transmits time constant control start signal #211 at time t3. Time constant control circuit 110 receiving time constant control start signal #211 for the first time reduces the time constant (first time constant) of low pass filters 106a, 106b which is a predetermined value during start-up period #206 of reception apparatus 100, set a new time constant (second constant) and reduces a propagation delay, thereby improving the response speed of the offset voltage calibration of the received signal. By changing the time constant in this way, the attenuation characteristic of the received signal at low pass filters 106a, 106b during the offset voltage calibration operation becomes more moderate than the attenuation characteristic of the received signal at low pass filters 106a, 106b outside the time of the offset voltage calibration operation.

After that, first decoder 109 outputs calibration start signal #212 at time t4. Voltage calibration circuit 111 receiving calibration start signal #212 for the first time executes the calibration operation. After that, after receiving calibration start signal #213 at time t5 for a second time in succession, voltage calibration circuit 111 stops the calibration operation and maintains calibrated data.

Next, time constant control start signal #214 is output from first decoder 109 at time t6 for a second time. Time constant control circuit 110 receiving time constant control start signal #214 returns the time constant of low pass filters 106a, 106b to the predetermined value (first time constant). By changing the time constant in this way, the attenuation characteristic of the received signal of low pass filters 106a, 106b after the offset voltage calibration operation is completed becomes steeper than the attenuation characteristic of the received signal at low pass filters 106a, 106b during the time of the offset voltage calibration operation.

After that, operation control start signal #215 is output from second decoder 112 at time t7 for a second time. Operation control circuit 113 receiving operation control start signal #215 switches the configuration circuit of high-frequency circuit 114, which was set in a non-operating state when operation control start signal #210 was received for the first time, to an operating state.

The timing for reducing the time constant of low pass filters 106a, 106b during offset voltage calibration period #207, the timing for returning this time constant to the predetermined value, the timing for setting the operating state of high-frequency circuit 114 to a non-operating state and the timing for returning high-frequency circuit 114 in the non-operating state to the operating state are shown in FIG. 6, but the underlying concept is as follows.

First, there is a possibility that the circuit may be saturated because it is not possible to attenuate interferer when the time constant of low pass filters 106a, 106b is reduced. Therefore, interferer are attenuated by setting the configuration circuit of high-frequency circuit 114 in a non-operating state before the time constant of low pass filters 106a, 106b is reduced or concurrently with the reduction of the time constant of low pass filters 106a, 106b.

Next, when the configuration circuit of high-frequency circuit 114 is returned from the non-operating state to the operating state, interferer cannot be suppressed, and therefore the time constant of low pass filters 106a, 106b is returned to the predetermined value before the operation switching of high-frequency circuit 114 or concurrently with the operation switching of high-frequency circuit 114.

In FIG. 6, a time difference is provided between the switching of the time constant of low pass filters 106a, 106b and the operation switching of high-frequency circuit 114, but it is obvious that both can be performed simultaneously.

Next, when the set gain is less than the threshold, even if second decoder 112 receives control start signal #209 as shown in time waveform #205, second decoder 112 does not output an operation control start signal, and therefore operation control circuit 113 does not switch the operation of high-frequency circuit 114 and keeps high-frequency circuit 114 in an operating state until an idle mode is set once again after reception apparatus 100 is started. By so doing, the stabilization period required after the switching of the time constants of low pass filters 106a, 106b can be shortened.

Therefore, when the set gain is less than a threshold, by delaying the timing for transmitting control start signal #209 compared to the case where the set gain is equal to or above the threshold and delaying the timing for the start of start-up period #206 of reception apparatus 100, it is possible to shorten offset voltage calibration period #207, that is, the operation time of reception apparatus 100.

The reason for setting high-frequency circuit 114 in an operating state or a non-operating state according to the set gain is that, when the set gain is equal to or above the threshold, the desired frequency component of reception apparatus 100 forms a weak electric field, and there is a possibility that reception apparatus 100 receives interferer at higher levels than the level of the desired frequency component, and, in this case, reception apparatus 100 may saturate unless high-frequency circuit 114 is set in a non-operating state to increase the amount of attenuation. On the other hand, when the set gain is less than the threshold, the level of the desired frequency component is high and reception apparatus 100 never saturates due to interferer.

In offset voltage calibration period #207, the threshold for determining whether or not to switch the operation of high-frequency circuit 114 depends on the 1[dB] gain compression point, which becomes a standard for the linearity of analog baseband circuits 115a, 115b and the level of interferer at the time of interfering wave testing specified for each radio system, and is set upon designing the circuit so that the circuit is not saturated.

In this way, according to this Embodiment 1, when the set gain is equal to or above the threshold—that is, the reception field intensity of interferer input from high-frequency circuit 114—is by far greater than the desired received signal, and, only when there is a possibility that the receiver may be saturated by interferer in offset voltage calibration period #207, is the operation of high-frequency circuit 114 such as low noise amplifier 101 or quadrature demodulator 103 stopped. On the other hand, when the set gain is less than a threshold—that is, when there is no possibility that the receiver may be saturated by interferer input from high-frequency circuit 114 in offset voltage calibration period #207—the operating state of the high-frequency circuit 114 such as low noise amplifier 101 or quadrature demodulator 103 is not changed before or after offset voltage calibration period #207 but is kept in an operating state. By this means, the offset voltage can be calibrated with high accuracy even in an environment in which interferer exist and the offset voltage can be calibrated fast by shortening the convergence time of transient response from an operation-stopped state to an operating state of high-frequency circuit 114. Furthermore, according to this Embodiment 1, no circuitry that is not indispensable to the reception operation is added to the path through which the received signal passes, and therefore the offset voltage can be calibrated fast and with high accuracy even in an environment in which interferer exist without causing noise characteristic degradation at the receiver.

According to Embodiment 1, although the operation of low noise amplifier 101 or quadrature demodulator 103 is stopped during the offset voltage calibration operation, it is equally possible to stop the operation of an arbitrary circuit part which is in the path through which the received signal in high-frequency circuit 114 passes. Furthermore, according to Embodiment 1, although high-frequency circuit 114 is in an operating state during the period from start-up mode period #206 until operation control circuit 113 receives operation control start signal #210 for the first time, high-frequency circuit 114 may also be set in a non-operating state and may be started after operation control start signal #215 is received for a second time.

Embodiment 2

Figure 7:
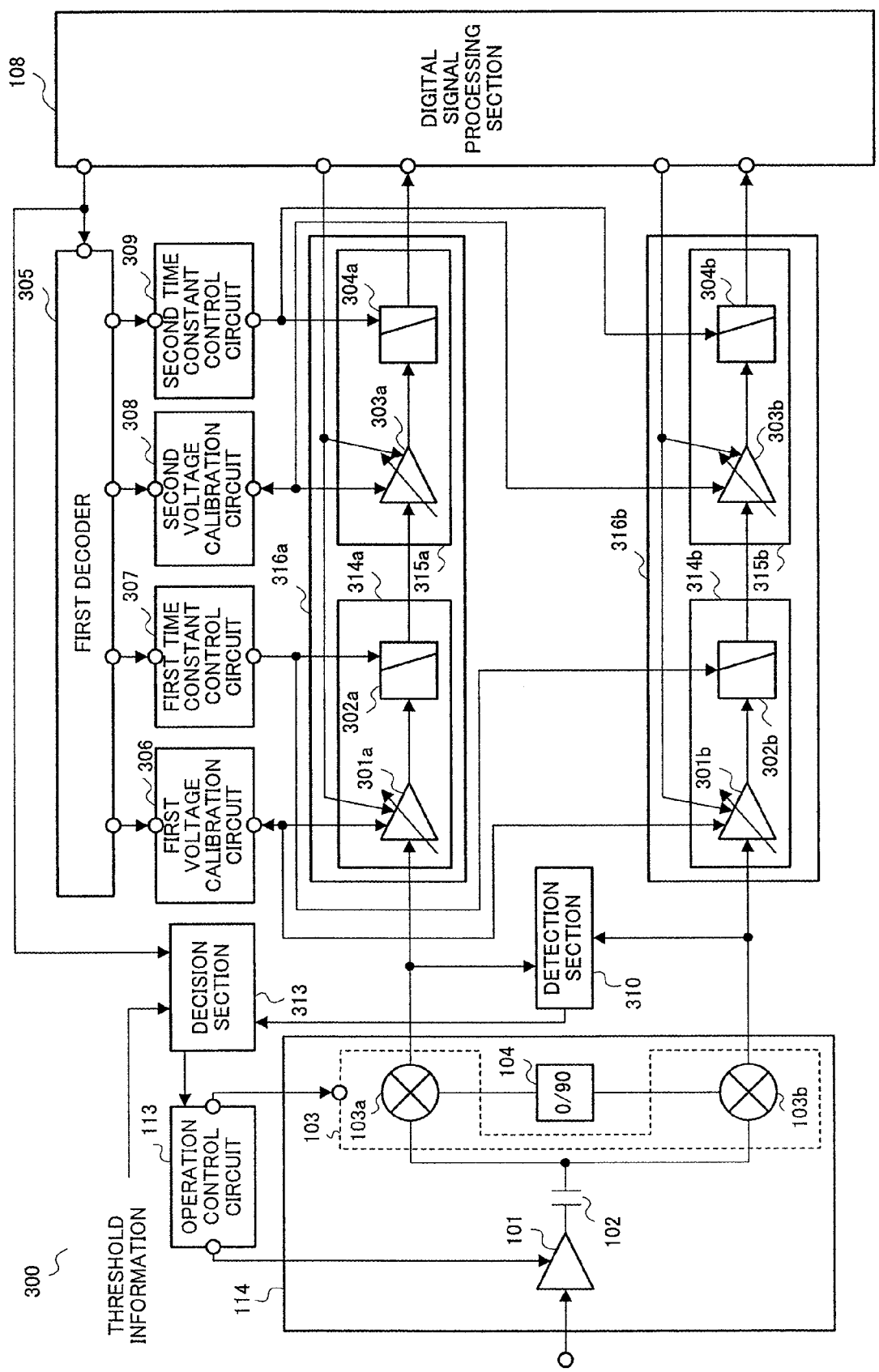
FIG. 7 is a block diagram showing the configuration of a reception apparatus according to Embodiment 2 of the present invention.

FIG. 7 is a block diagram showing the configuration of reception apparatus 300 according to of Embodiment 2 of the present invention.

Reception apparatus 300 according to this Embodiment 2 corresponds to: reception apparatus 100 according to of Embodiment 1 shown in FIG. 5 with second decoder 112 removed, as shown in FIG. 7; detection section 310 and decision section 313 added; variable gain amplifiers 301a, 301b, low pass filters 302a, 302b, variable gain amplifiers 303a, 303b and low pass filters 304a, 304b included instead of variable gain amplifiers 105a, 105b, low pass filters 106a, 106b and variable gain amplifiers 107a, 107b; first voltage calibration circuit 306, first time constant control circuit 307, second voltage calibration circuit 308 and second time constant control circuit 309 included instead of time constant control circuit 110; and voltage calibration circuit 111 and first decoder 305 included instead of first decoder 109. In FIG. 7, the same components as those in FIG. 5 are assigned the same reference numerals and explanations thereof will be omitted.

Variable gain amplifier 301a and low pass filter 302a constitute first stage circuit 314a. Variable gain amplifier 301b and low pass filter 302b constitute first stage circuit 314b. Variable gain amplifier 303a and low pass filter 304a constitute second stage circuit 315a. Variable gain amplifier 303b and low pass filter 304b constitute second stage circuit 315b. First stage circuit 314a and second stage circuit 315a constitute analog baseband circuit 316a. First stage circuit 314b and second stage circuit 315b constitute analog baseband circuit 316b. Analog baseband circuits 316a, 316b perform gain control and offset voltage calibration in a plurality of stages. Offset voltage calibration is performed sequentially from earlier circuit to later circuit, and, with regard to circuits included in the same stage circuit, calibration is performed sequentially from circuits that are closest to quadrature demodulator 103.

Digital signal processing section 108 recovers the data signal from a received signal input from low pass filter 304a and low pass filter 304b, and displays data on a display section (not shown) or outputs an audio signal to a speaker (not shown). Furthermore, digital signal processing section 108 sets such a gain that the received signal input from low pass filter 304a and low pass filter 304b satisfies predetermined reception quality, controls variable gain amplifier 301a, variable gain amplifier 301b, variable gain amplifier 303a and variable gain amplifier 303b such that the received signal has the set gain, and outputs gain information, which is information about the set gain, to decision section 313. Furthermore, digital signal processing section 108 outputs a control start signal, which indicates the start of the offset voltage calibration of the received signal, to first decoder 305 and decision section 313 at a predetermined time.

When an operation control start signal stopping the operation of low noise amplifier 101 or quadrature demodulator 103 is input from decision section 313, operation control circuit 113 performs such control as to stop the operation of low noise amplifier 101 or quadrature demodulator 103. When an operation control start signal not stopping the operation of low noise amplifier 101 and quadrature demodulator 103 is input from decision section 313, operation control circuit 113 performs no control over low noise amplifier 101 and quadrature demodulator 103.

Variable gain amplifier 301a is a gain control section and calibrates the offset voltage of the received signal input from quadrature demodulator 103 based on the control of first voltage calibration circuit 306. Furthermore, variable gain amplifier 301a performs gain control such that the received signal input from quadrature demodulator 103 is set to a predetermined gain according to an instruction from digital signal processing section 108 and outputs the signal to low pass filter 302a.

Variable gain amplifier 301b is a gain control section and calibrates the offset voltage of the received signal input from quadrature demodulator 103 based on the control of first voltage calibration circuit 306. Furthermore, variable gain amplifier 301b performs gain control such that the received signal input from quadrature demodulator 103 is set to a predetermined gain according to an instruction from digital signal processing section 108 and outputs the signal to low pass filter 302b.

Low pass filter 302a is a filter section and removes unnecessary components such as interferer by letting pass only predetermined low frequency of the received signal input from variable gain amplifier 301a based on the control of first time constant control circuit 307, and outputs the result to variable gain amplifier 303a.

Low pass filter 302b is a filter section and removes unnecessary component such as interferer by letting pass only predetermined low frequency of the received signal input from variable gain amplifier 301b based on the control of first time constant control circuit 307, and outputs the result to variable gain amplifier 303b.

Variable gain amplifier 303a is a gain control section and calibrates the offset voltage of the received signal input from low pass filter 302a based on the control of second voltage calibration circuit 308. Furthermore, variable gain amplifier 303a performs gain control such that the received signal input from low pass filter 302a is set to a predetermined gain according to an instruction from digital signal processing section 108, and outputs the signal to a low pass filter 304a.

Variable gain amplifier 303b is a gain control section and calibrates the offset voltage of the received signal input from low pass filter 302b based on the control of second voltage calibration circuit 308. Furthermore, variable gain amplifier 303b performs gain control such that the received signal input from low pass filter 302b is set to a predetermined gain according to an instruction from digital signal processing section 108, and outputs the signal to low pass filter 304b.

Low pass filter 304a is a filter section and removes unnecessary components such as interferer by letting pass only predetermined low frequency of the received signal input from variable gain amplifier 303a based on the control of second time constant control circuit 309, and outputs the result to digital signal processing section 108.

Low pass filter 304b is a filter section and removes unnecessary components such as interferer by letting pass only predetermined low frequency of the received signal input from variable gain amplifier 303b based on the control of second time constant control circuit 309, and outputs the signal to digital result processing section 108.

When a control start signal is input from digital signal processing section 108, first decoder 305 outputs a first calibration start signal to first voltage calibration circuit 306 after a predetermined time and also outputs a second calibration start signal to second voltage calibration circuit 308. Furthermore, when a control start signal is input from digital signal processing section 108, first decoder 305 outputs a first time constant control start signal to first time constant control circuit 307 after a predetermined time and also outputs a second time constant control start signal to second time constant control circuit 309.

First voltage calibration circuit 306 performs control such that offset voltage calibration is carried out on variable gain amplifier 301a and variable gain amplifier 301b based on the first calibration start signal input from first decoder 305, or performs control such that offset voltage calibration is stopped.

First time constant control circuit 307 is a time constant control section and controls the time constant to adjust the amount of attenuation at low pass filter 302a and low pass filter 302b based on the first time constant control start signal input from first decoder 305.

Second voltage calibration circuit 308 performs control such that offset voltage calibration is carried out on variable gain amplifier 303a and variable gain amplifier 303b based on the second control start signal input from first decoder 305, or performs control such that offset voltage calibration is stopped.

Second time constant control circuit 309 is a time constant control section and controls the time constant to adjust the amount of attenuation at low pass filter 304a and low pass filter 304b based on the time constant control start signal input from first decoder 305.

Detection section 310 is provided to monitor the output of quadrature demodulator 103, measures the received power level of the received signals input from mixer 103a and mixer 103b and outputs the measurement result to decision section 313 as level information.

When a control start signal is input from digital signal processing section 108, decision section 313 compares the level in the level information input from detection section 310 with a threshold. When the level is equal to or above the threshold, decision section 313 decides that there exist interferer which become saturation factors of analog baseband circuits 316a, 316b when the amount of attenuation of interferer decreases with a reduction in the time constant of low pass filter 302a and low pass filter 302b carried out during the offset voltage calibration period, and outputs an operation control start signal stopping the operation of low noise amplifier 101 or quadrature demodulator 103 of high-frequency circuit 114, to operation control circuit 113. On the other hand, when the level is less than the threshold, decision section 313 decides that there exist no interferer which become saturation factors of analog baseband circuits 316a, 316b under the above condition and outputs an operation control start signal not stopping the operation of low noise amplifier 101 and quadrature demodulator 103 of high-frequency circuit 114 to operation control circuit 113.

Figure 8:
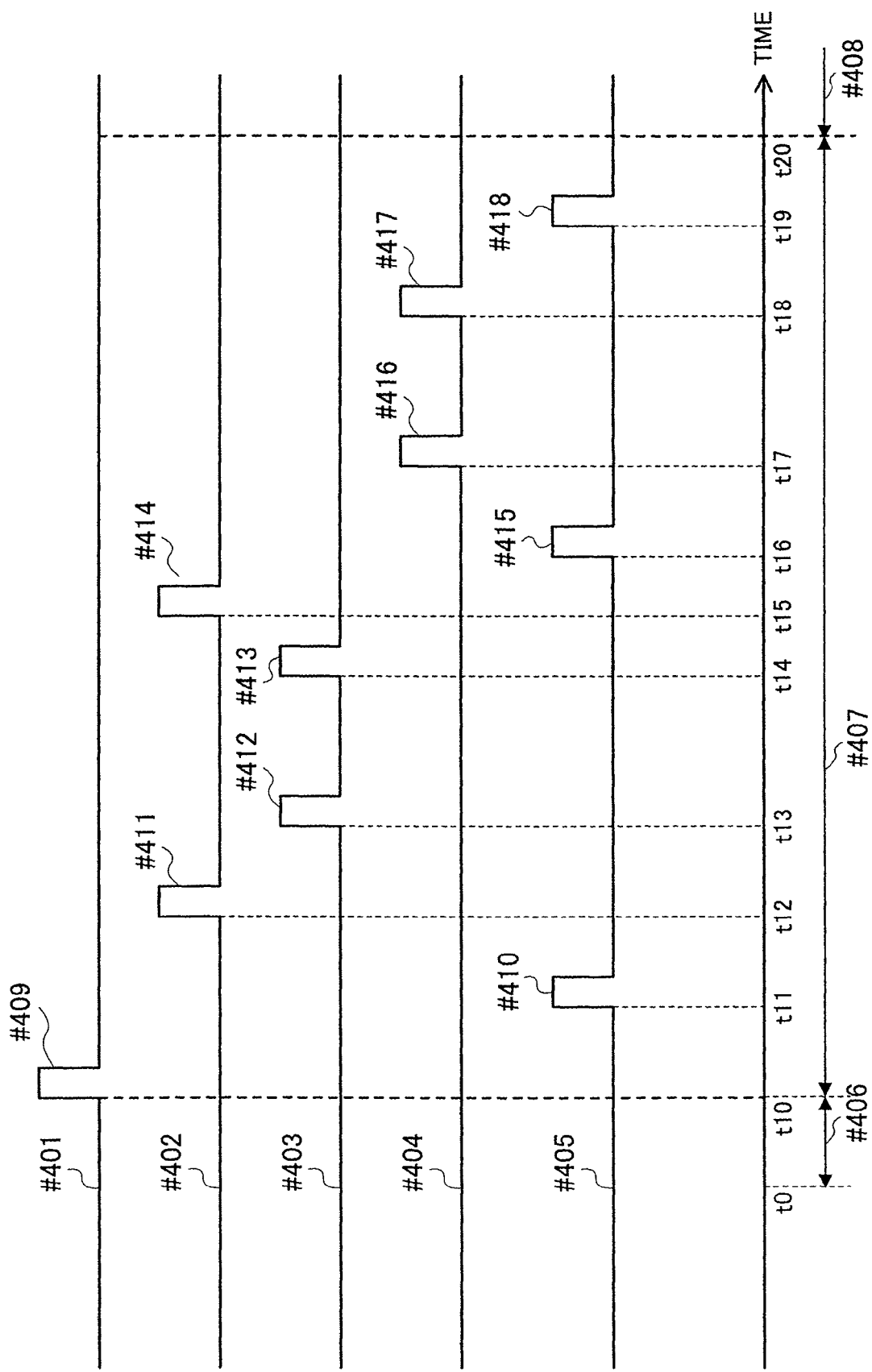
FIG. 8 is a flow chart showing the operation of the reception apparatus according to Embodiment 2 of the present invention.

Next, the operation of reception apparatus 300 will be explained using FIG. 8. FIG. 8 is a time chart showing the control operation at reception apparatus 300. FIG. 8 shows time waveform #401 of a control start signal which is output from digital signal processing section 108, time waveform #402 of a first time constant control start signal which is output from first decoder 305, time waveform #403 of a first calibration start signal which is output from first decoder 305, time waveform #404 of a second calibration start signal which is output from first decoder 305 and time waveform #405 of an operation control start signal which is output from decision section 313. Furthermore, in FIG. 8, time t0 to time t10 is start-up mode period #406 of reception apparatus 300, time t10 to time t20 is offset voltage calibration period #407 which is a period for calibrating the offset voltage of the received signal and the period from time t20 onward is reception mode period #408.

After start-up mode period #406 of reception apparatus 300, control start signal #409 is output from digital signal processing section 108 at time t10, which becomes a trigger starting of offset voltage calibration period #407. Decision section 313 receiving control start signal #409 compares and decides the level in the level information input from detection section 310 with a threshold. Next, decision section 313 outputs operation control start signal #410 according to the above comparison/decision result at time t11.

When it is decided from the comparison/decision result that there exist interferer which become saturation factors of analog baseband circuits 316a, 316b, operation control start signal #410 stopping the operation of low noise amplifier 101 or quadrature demodulator 103 of high-frequency circuit 114 is output to operation control circuit 113, and operation control circuit 113 receiving operation control start signal #410 sets low noise amplifier 101 or quadrature demodulator 103 constituting high-frequency circuit 114 in a non-operating state, thereby reducing the leakage of interferer. Next, at time t12, first decoder 305 outputs first time constant control start signal #411. First time constant control circuit 307 receiving first time constant control start signal #411 for the first time reduces the time constant (first time constant) of low pass filters 302a, 302b, which was a predetermined value during start-up period #406 of reception apparatus 300, sets a new time constant (second time constant) and reduces the propagation delay, thereby improving the response speed of the offset voltage calibration operation. By changing the time constant in this way, the attenuation characteristic of the received signal at low pass filters 302a, 302b during the offset voltage calibration operation with respect to first stage circuits 314a, 314b is more moderate than the attenuation characteristic of the received signal at low pass filters 302a, 302b outside the time of the offset voltage calibration operation.

After that, at time t13, first decoder 305 outputs first calibration start signal #412. First voltage calibration circuit 306 receiving first calibration start signal #412 for the first time executes the calibration operation on first stage circuits 314a, 314b. Then, first calibration start signal #413 is output from first decoder 305 for a second time at time t14. After receiving first calibration start signal #413 for a second time, first voltage calibration circuit 306 stops the calibration operation and maintains calibration data. By this means, the calibration processing in the stage (switching stage) of first stage circuits 314a, 314b is completed.

Next, first time constant control start signal #414 is output from first decoder 305 for a second time at time t15 after a predetermined time. First time constant control circuit 307 receiving first time constant control start signal #414 returns the time constant of low pass filters 302a, 302b to the predetermined value (first time constant). By changing the time constant in this way, the attenuation characteristic of the received signal at low pass filters 302a, 302b with respect to first stage circuits 314a, 314b after the offset voltage calibration operation is completed becomes steeper than the amount of attenuation of the received signal at low pass filters 302a, 302b during the offset voltage calibration operation.

After that, operation control start signal #415 is output from decision section 313 for a second time at time t16. Operation control circuit 113 receiving operation control start signal #415 sets the configuration circuit of high-frequency circuit 114 which has been set in a non-operating state by first operation control signal #410 in an operating state. The convergence time for transient response accompanying this operation switching is provided, and, after a steady state is recovered, first decoder 305 outputs a second time constant control start signal. Second time constant control circuit 309 receiving the second time constant control start signal for the first time reduces the time constant (first time constant) of low pass filters 304a, 304b which was a predetermined value during start-up mode period #406 of reception apparatus 300, sets a new time constant (second time constant) and reduces the propagation delay, thereby improving the response speed in the offset voltage calibration operation. By changing the time constant in this way, the attenuation characteristic of the received signals at low pass filters 304a, 304b during the calibration operation with respect to second stage circuits 315a, 315b becomes more moderate than the attenuation characteristic of the received signal at low pass filters 304a, 304b outside the time of the offset voltage calibration operation.

Next, first decoder 305 outputs second calibration start signal #416 at time t17. Second voltage calibration circuit 308 receiving second calibration start signal #416 for the first time executes the calibration operation on second stage circuits 315a, 315b including the remaining offset caused by the switching operation of the configuration circuit of high-frequency circuit 114 executed at time t16. Then, at time t18, first decoder 305 outputs second calibration start signal #417 for a second time. Second voltage calibration circuit 308 receives next second-time second calibration start signal #417 and then stops the calibration operation and maintains calibration data. With this, the calibration processing in the stage (switching stage) of second stage circuits 315a, 315b is completed.

Next, after a predetermined time, first decoder 305 outputs second time constant control start signal for a second time. Second time constant control circuit 309 receiving the second time constant control start signal returns the time constant of lowpass filters 304a, 304b to a predetermined value (first time constant). By changing the time constant in this way, the attenuation characteristic at low pass filters 304a, 304b after the offset voltage calibration operation is completed becomes steeper than the attenuation characteristic of the received signal at low pass filters 304a, 304b during the offset voltage calibration operation.

After that, decision section 313 outputs operation control start signal #418 at time t19 for a third time. Operation control circuit 113 receiving operation control start signal #418 does not change the operating state of the configuration circuit of high-frequency circuit 114.

Next, it is decided from the comparison/decision result that there exist no interferer which become saturation factors of analog baseband circuits 316a, 316b, operation control start signal #410 not stopping the operations of low noise amplifier 101 and quadrature demodulator 103 of high-frequency circuit 114 is output to operation control circuit 113, and then, until reception operation period #408, the configuration circuit of high-frequency circuit 114 is in an operating state. The operations of first decoder 305, first voltage calibration circuit 306, first time constant control circuit 307, second voltage calibration circuit 308, second time constant control circuit 309 are the same as in the case where it is decided that there exist interferer, and explanations thereof will be omitted.

In FIG. 8, a time difference is provided between the switching of the time constant of low pass filter 302a, low pass filter 302b, low pass filter 304a and low pass filter 304b and the switching of the operation of high-frequency circuit 114, but it is obvious that the switching of the time constant and the switching of the operation can be performed at the same time.

According to this Embodiment 2, analog baseband circuits 316a, 316b are provided in a multi-stage circuit configuration, and offset voltage calibration is performed in each stage, from earlier circuit, sequentially, while suppressing interferer, and therefore, even if correction differences are caused by the change of the operating state of high-frequency circuit 114 which has been set in a pause state for suppression of interferer after the calibration of the earlier stage circuit is completed, the second stage circuit performs calibration including the above described correction differences, and can thereby realize calibration of an offset voltage and prevent noise characteristic deterioration at reception apparatus 300 since no additional circuitry such as a dummy LNA or impedance compensation block for suppressing the correction differences is used. Furthermore, according to this Embodiment 2, it is decided whether or not reception apparatus 300 is saturated by interferer before or after the offset voltage calibration operation is executed, and, if it is decided that reception apparatus 300 is not saturated, the operating state of high-frequency circuit 114 is not switched before or after the offset voltage calibration operation is executed, so that it is possible to reduce the convergence time for transient response from an operation stopped state to an operating state of high-frequency circuit 114 and improve resistance against interferer and perform highly accurate offset voltage calculation. Furthermore, according to this Embodiment 2, the circuit which is not indispensable to the reception operation is not added to the path through which the received signal passes, and therefore it is possible to calibrate the offset voltage fast and with high accuracy even in an environment in which interferer exist without causing any degradation of the noise characteristic of the receiver.

In this Embodiment 2, it is automatically decided by detection section 310 and decision section 313 whether or not cases occur where reception apparatus 300 is saturated before the offset voltage calibration operation is executed, but the present invention is not limited to this, and, even if detection section 310 and the function of deciding whether or not interferer exist from level information input from detection section 310 in decision section 313 are removed, it is still possible to set decision criteria for determining whether or not reception apparatus 300 saturates at the time of circuit design and fix whether the operating state of high-frequency circuit 114 is stopped during the offset voltage calibration operation in each stage of earlier stage circuit and later stage circuit or whether the operating state is kept or not based on regulations for interferer in the system to which high-frequency circuit 114 is adopted, the gains of the individual circuits of reception apparatus 300 during normal reception operation, the amount of attenuation under interferer of low pass filters 302a, 302b, 304a, 304b, the level at which an input signal can be blocked when high-frequency circuit 114 is in an operation stopped state. In this case, even if a correction difference is caused by a change of the operating state of high-frequency circuit 114, which has been set in a pause state for suppression of interferer after the calibration of earlier stage circuit is completed, later stage circuit performs calibration including correction difference calibration, so that it is possible to offset voltage calculation of high accuracy and shorten the interval from time t10 to time t11 required for the automatic decision function.

Furthermore, in this Embodiment 2, although the analog baseband circuit has a two-stage circuit configuration having a first stage circuit and a second stage circuit, the present invention is not limited to this, and the analog baseband circuit may adopt a multi-stage configuration with three or more stages or may not adopt a multi-stage configuration. When the analog baseband circuit adopts a multi-stage configuration, upon the calibration operation in a stage subsequent to a predetermined stage (switching stage), the time constant for at least one filter in the predetermined stage or earlier stage than the predetermined stage is changed to a first time constant, which is increased from a second time constant, and the time constant of other filter is set with the second time constant. By this means, even if a correction difference is caused by a change of the operating state of high-frequency circuit 114, which is set in a pause state for suppression of interferer after the calibration in earlier stage circuit is completed, later stage circuit performs calibration including the correction difference calibration, so that it is possible to realize offset voltage calibration of high accuracy, reduce the time constant of a filter at a position influencing the calibration operation speed and thereby perform fast and highly accurate offset voltage calibration even in an environment in which interferer exist, without causing noise characteristic degradation of the receiver.

Furthermore, in this Embodiment 2, although the operation of low noise amplifier 101 and quadrature demodulator 103 is stopped during the offset voltage calibration operation, the present invention is not limited to this, and the operation of arbitrary circuit part in the path in high-frequency circuit 114 where the received signal passes, may be stopped. Furthermore, this Embodiment 2 may also be applied to above described Embodiment 1. In this case, in FIG. 5, it is possible to adopt analog baseband circuits 316a, 316b in FIG. 7 instead of analog baseband circuits 115a, 115b and make the analog baseband circuit in a multi-stage configuration, and perform offset voltage calibration and time constant control in each stage as in Embodiment 2. Furthermore, in this Embodiment 2, high-frequency circuit 114 is set in an operating state during the period from start-up mode period #406 until operation control circuit 113 receives first operation control start signal #410, but it is also possible to set high-frequency circuit 114 in anon-operating state and start high-frequency circuit 114 after operation control start signal #415 is received for a second time. Furthermore, this Embodiment 2 has explained an example where the time constant of low pass filters 302a, 302b and low pass filters 304a, 304b are set to a second time constant during the offset voltage calibration operation and to a first time constant after the calibration is completed, but the time constants of low pass filters 302a, 302b and low pass filters 304a, 304b may differ from each other during their respective operations.

Embodiment 3

Figure 9:
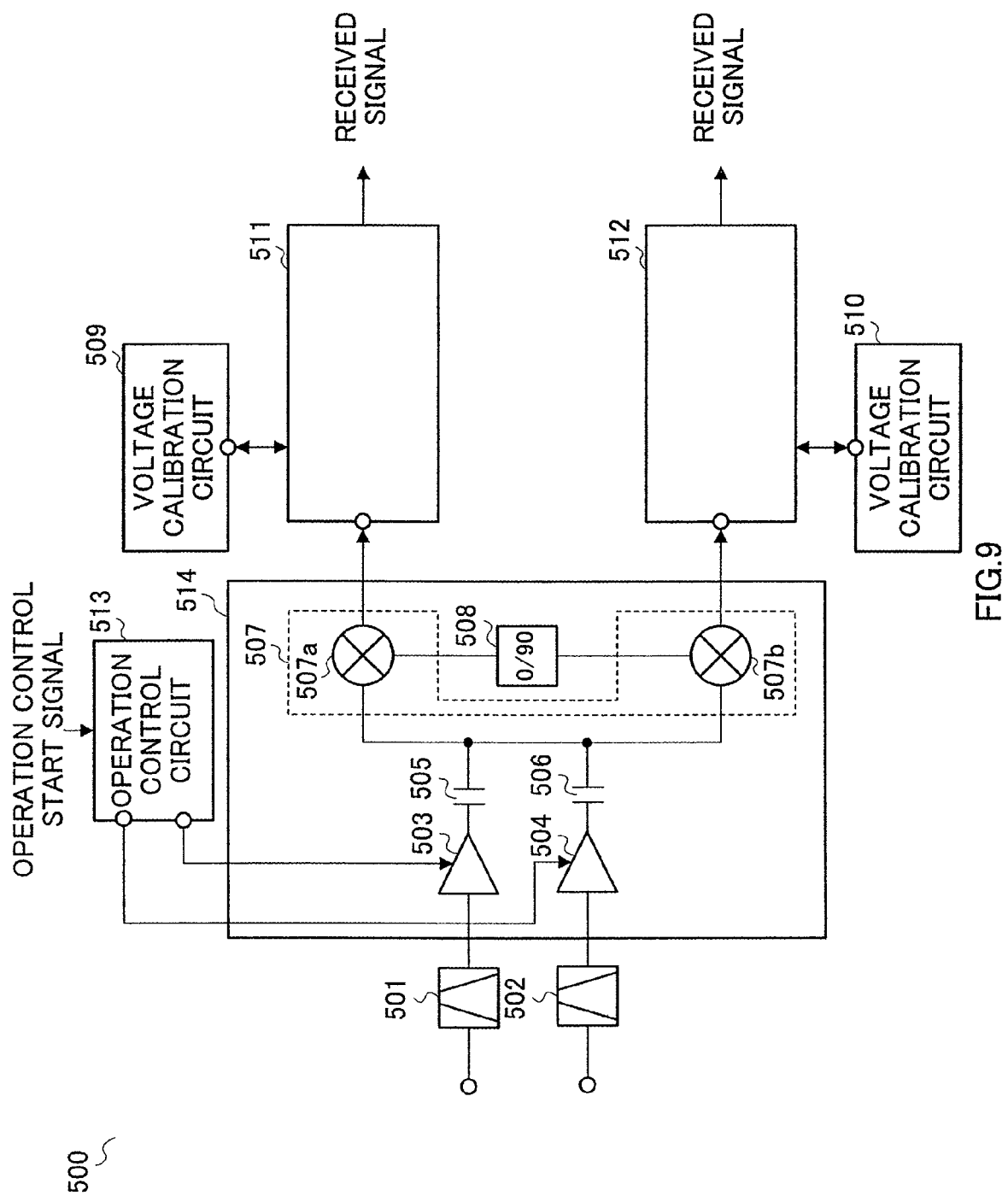
FIG. 9 is a block diagram showing the configuration of a reception apparatus according to Embodiment 3 of the present invention.

FIG. 9 is a block diagram showing the configuration of reception apparatus 500 according to Embodiment 3 of the present invention.

First low noise amplifier 503, second low noise amplifier 504, capacitor 505, capacitor 506 and quadrature demodulator 507 constitute high-frequency circuit 514. Furthermore, mixer 507a and mixer 507b constitute quadrature demodulator 507, which is a demodulation section.

First bandpass filter 501, corresponding to, for example, a GSM 850 MHz band, lets pass and outputs only a received signal of a predetermined band, to first low noise amplifier 503.

Second bandpass filter 502, corresponding to, for example, a GSM 900 MHz band, lets pass and outputs only the received signal of a predetermined band, to second low noise amplifier 504.

First low noise amplifier 503 is an amplification section and amplifies the received signal input from first bandpass filter 501 based on the control of operation control circuit 513, and outputs the amplified signal to mixer 507a and mixer 507b through capacitor 505.

Second low noise amplifier 504 is an amplification section and amplifies the received signal input from second bandpass filter 502 based on the control of operation control circuit 513, and outputs the amplified signal to mixer 507a and mixer 507b through capacitor 506.

Mixer 507a converts the frequency of the received signal input from capacitor 505 from a radio frequency to a baseband and outputs the baseband signal to analog baseband circuit 511.

Mixer 507b transforms the frequency of the received signal input from capacitor 506 from a radio frequency to a baseband and outputs the result to analog baseband circuit 512.

Phase shifter 508 generates two signals having a phase difference of 90 degrees from each other from a local oscillation signal output from a local oscillation source (not shown), and outputs the signals to mixer 507a and mixer 507b of quadrature demodulator 507, respectively.

Voltage calibration circuit 509 controls analog baseband circuit 511 so as to calibrate the offset voltage produced in the received signal subject to gain-control by analog baseband circuit 511.

Voltage calibration circuit 510 controls analog baseband circuit 512 so as to calibrate the offset voltage produced in the received signal subject to gain-control by analog baseband circuit 512.

Analog baseband circuit 511 calibrates the offset voltage of the received signal input from mixer 507a based on the control of voltage calibration circuit 509, controls the gain to a predetermined gain, and outputs the signal to a digital signal processing section (not shown).

Analog baseband circuit 512 calibrates the offset voltage of the received signal input from mixer 507b based on the control of voltage calibration circuit 510, controls the gain to a predetermined gain, and outputs the signal to a digital signal processing section (not shown).

When an operation control start signal is input, operation control circuit 513 performs such switching control as to operate one of first low noise amplifier 503 and second low noise amplifier 504 to which the received signal is not input then and stop the operation of the other one of first low noise amplifier 503 and second low noise amplifier 504 to which the received signal is input then.

Next, the operation of reception apparatus 500 in a case where reception apparatus 500 is receiving a received signal in a GSM 850 MHz band will be explained as a specific example. Before the offset voltage calibration operation starts, using an operation control start signal input from a digital signal processing section (not shown) as a trigger signal, operation control circuit 513 outputs a first operation control signal and sets first low noise amplifier 503 in a non-operating state, and outputs a second operation control signal and sets second low noise amplifier 504 in an operating state. Here, since the service areas of the GSM 850 MHz band and the GSM 900 MHz band are not close to each other, no signal appears at the input terminal of second low noise amplifier 504 due to the frequency selection effect of second bandpass filter 502, and, since first low noise amplifier 503 is in a non-operating state and it is possible to suppress interferer which exist at the input terminal of first low noise amplifier 503, it is possible to suppress signal power which leaks in later received signal processing after quadrature demodulator 507, and improve resistance against interferer.

On the other hand, immediately before a reception mode period after the offset voltage calibration operation is completed, using an operation control start signal input once again from a digital signal processing section (not shown) as a trigger signal, operation control circuit 513 outputs a first operation control signal to set first low noise amplifier 503 in an operating state and outputs a second operation control signal to set second low noise amplifier 504 in a non-operating state.

In the GSM (Global System for Mobile communications) system, which is widespread in European and Asian regions (excluding Japan), major frequency bands used for the reception system for portable terminals include the GSM 850 MHz band (869 MHz to 894 MHz), GSM 900 MHz band (925 MHz to 960 MHz), DCS 1800 MHz band (1805 MHz to 1880 MHz) and PCS 1900 MHz band (1930 MHz to 1990 MHz). Generally, the GSM 850 MHz band and GSM 900 MHz band, or the DCS 1800 MHz band and PCS 1900 MHz band, are not used in neighboring cells.

To make a reception apparatus supporting to these four bands of the GSM system, in consideration of the proximity relationship of the frequency bands with respect to gains in and noise characteristic deviations in the bands, quadrature demodulator 507 can be shared in the GSM 850 MHz band and GSM 900 MHz band and also in the DCS 1800 MHz band and PCS 1900 MHz band. On the other hand, with regard to low noise amplifiers 503, 504, the noise characteristic of low noise amplifiers 503, 504 is dominant over the overall noise characteristic of the reception apparatus, and it is necessary to adopt optimal configuration for each of the four bands, and therefore it is necessary to adopt a configuration that supports the four bands discreetly. Therefore, FIG. 9 shows the configuration of high-frequency circuit 514 in realizing, for example, a dual-band reception apparatus for the GSM 850 MHz band and the GSM 900 MHz band.

Thus, according to this Embodiment 3, since the low noise amplifier to which no received signal is input operates, without using additional circuitry which becomes a factor for noise characteristic degradation at reception apparatus 500 such as a dummy LNA and impedance compensation block, even if the operating state of the low noise amplifier for amplification of the received signal differs between the offset voltage calibration period and the reception mode period, it is possible to keep the reflection coefficient at the input terminal of the quadrature demodulator substantially constant and restrain the residual offset voltage caused by the self-mixing generated in the quadrature demodulator. Furthermore, according to this embodiment 3, the input terminal of each low noise amplifier is connected to the external terminal outside the semiconductor integrated circuit when the high-frequency circuit is integrated, and therefore it is possible to suppress the residual offset voltage caused by the reflected signal of a local oscillation signal which leaks out of the integrated circuit, and secure the amount of attenuation of the received signal during the offset voltage calibration operation, and thereby perform offset voltage calibration with high accuracy even in an environment where interferer exist, without causing noise characteristic degradation.

This Embodiment 3 assumes that a received signal in the GSM 850 MHz band and a received signal in the GSM 900 MHz band are received, but the present invention is not limited to this, and the present invention is also applicable to a case where received signals in different bands are received in an arbitrary communication system other than the GSM 850 MHz band and the GSM 900 MHz band.

Embodiment 4

Figure 10:
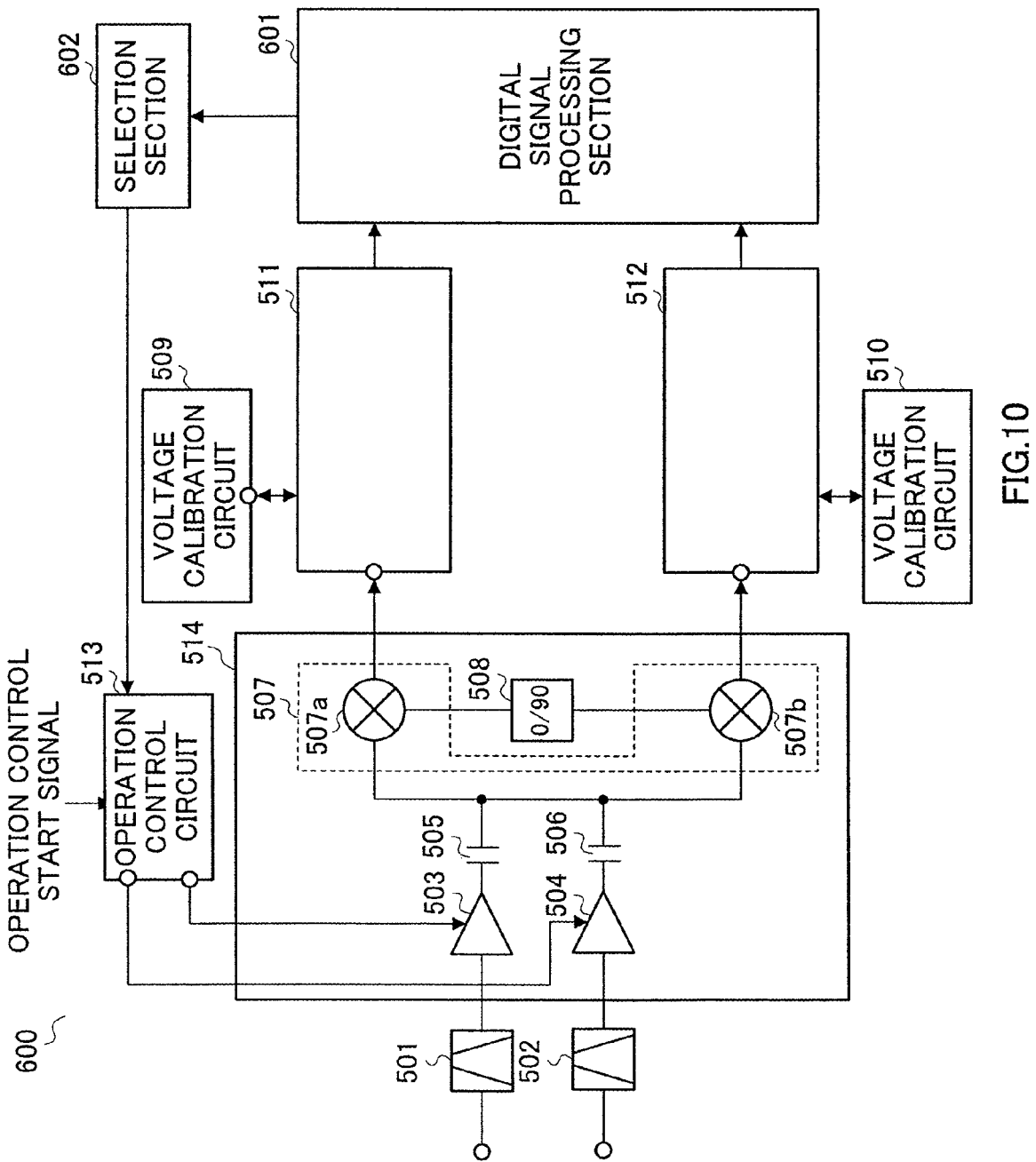
FIG. 10 is a block diagram showing the configuration of a reception apparatus according to Embodiment 4 of the present invention.

FIG. 10 is a block diagram showing the configuration of reception apparatus 600 according to Embodiment 4 of the present invention.

Reception apparatus 600 according to this embodiment 4 corresponds to reception apparatus 500 according to Embodiment 3 shown in FIG. 9 with digital signal processing section 601 and selection section 602 added as shown in FIG. 10. In FIG. 10, the same components as those in FIG. 9 are assigned the same reference numerals and explanations thereof will be omitted.

As assumed in Embodiment 3, FIG. 10 shows the configuration of high-frequency circuit 514 in realizing a dual-band reception apparatus for the GSM 850 MHz band and the GSM 900 MHz band. Furthermore, as in the case of Embodiment 3, first low noise amplifier 503 is for amplification of received signals in the GSM 850 MHz band and second low noise amplifier 504 is for amplification of received signals in the GSM 900 MHz band. This embodiment 4 will explain a case where reception apparatus 600 receives signals in the GSM 850 MHz band, as an example.

Analog baseband circuit 511 calibrates the offset voltage of the received signal input from mixer 507a based on the control of voltage calibration circuit 509, controls the gain to a predetermined gain, and outputs the signal to digital signal processing section 601.

Analog baseband circuit 512 calibrates the offset voltage of the received signal input from mixer 507b based on the control of voltage calibration circuit 510, controls the gain to a predetermined gain, and outputs the signal to digital signal processing section 601.

Digital signal processing section 601 recovers the data signal from the received signal input from analog baseband circuits 511, 512, displays data on a display section (not shown) or outputs an audio signal to a speaker (not shown). Furthermore, digital signal processing section 601 outputs information about the radio frequency band used in a nearby cells of reception apparatus 600 (hereinafter "nearby cell information") out of control channel information included in the data signal to selection section 602.

Selection section 602 stores low noise amplifier selection information (first selection information) which associates information on the radio frequency band (hereinafter "supported frequency band") to which reception apparatus 600 is applicable, with low noise amplifiers 503, 504 provided for each supported frequency band. Then, using the proximity cell information input from digital signal processing section 601 and with reference to low noise amplifier selection information, selection section 602 selects a low noise amplifier for a band used in nearby cells and outputs operation amplifier information during the reception operation to operation control circuit 513, and selects a low noise amplifier for a band not used in nearby cells and outputs operation amplifier information during offset voltage calibration, to operation control circuit 513.

Operation control circuit 513 performs such control as to reduce the offset voltage caused by stopping the operation of first low noise amplifier 503 or second low noise amplifier 504. That is, before the offset voltage calibration operation starts, using an operation control start signal input from digital signal processing section 601 as a trigger signal, operation control circuit 513 outputs a first operation control signal and sets first low noise amplifier 503 in a non-operating state, and outputs a second operation control signal and sets second low noise amplifier 504 in an operating state. On the other hand, immediately before the reception mode period after the offset voltage calibration operation is completed, using the operation control start signal input again from digital signal processing section 601 as a trigger signal, operation control circuit 513 outputs a first operation control signal and sets first low noise amplifier 503 in an operating state, and outputs a second operation control signal and sets second low noise amplifier 504 in a non-operating state. That is, when selecting a low noise amplifier to operate during the reception mode period and a low noise amplifier to operate during the offset voltage calibration operation, based on reception time operation amplifier information and offset voltage calibration time operation amplifier information, operation control circuit 513 operates the low noise amplifier specified by the reception time operation amplifier information during the reception mode period and operates the low noise amplifier specified by the offset voltage calibration operation amplifier information during the offset voltage calibration operation period.

This Embodiment 4 selects a low noise amplifier applicable to the frequency band farthest from the received signal band in the GSM 850 MHz band and operates the low noise amplifier during the offset voltage calibration operation, and can thereby restrain saturation in the quadrature demodulator and subsequent circuitry caused by interferer and misoperation of in the offset voltage calibration operation.

Thus, according to this Embodiment 4, in addition to the advantage of above Embodiment 3, it is possible to accurately select the low noise amplifier to operate during the offset voltage calibration operation. Furthermore, according to this Embodiment 4, a low noise amplifier in a band not used in nearby cells is operated, so that offset voltage calibration can be performed with high accuracy even in an environment in which interferer exist.

Embodiment 5

Figure 11:
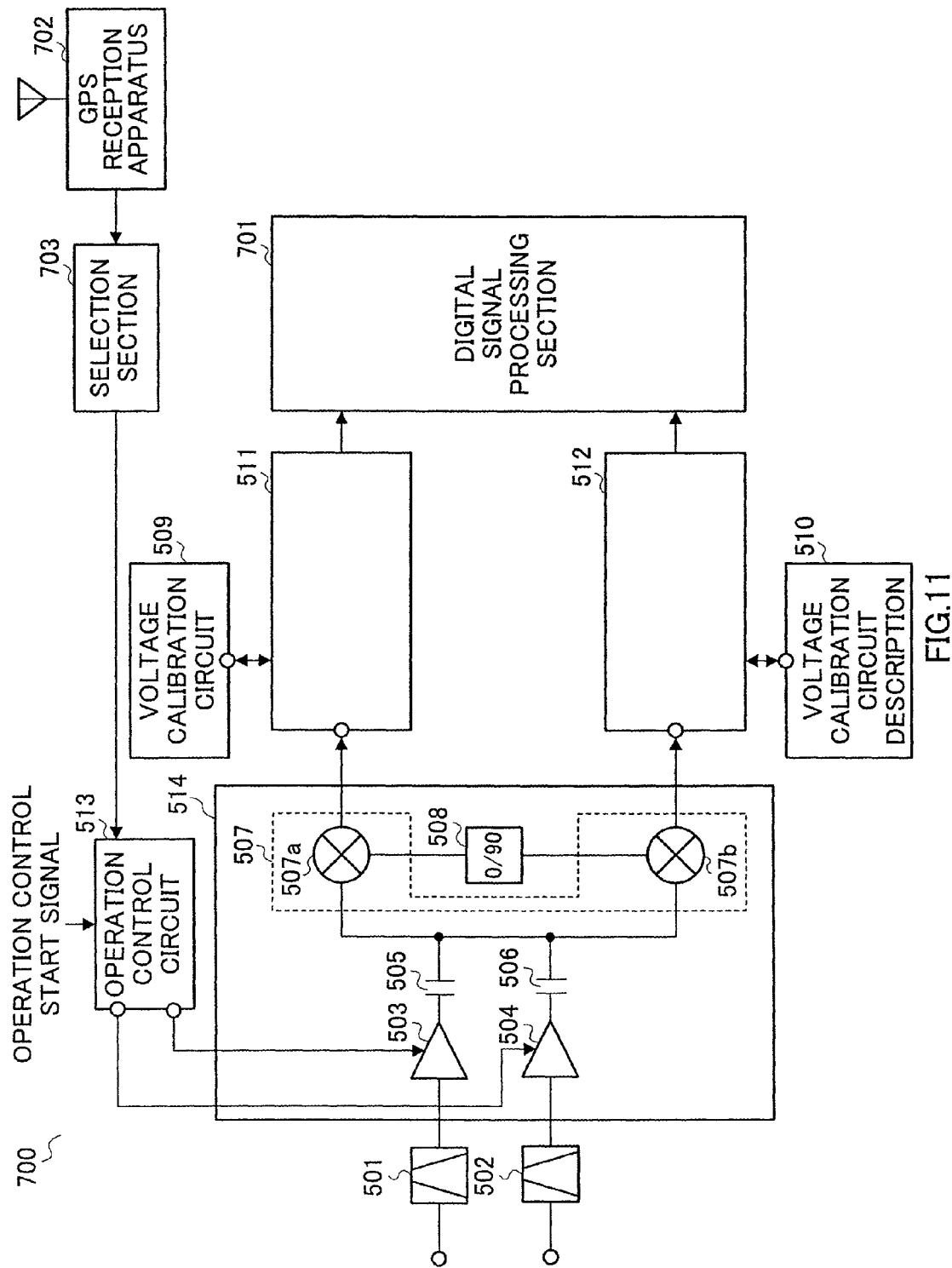
FIG. 11 is a block diagram showing the configuration of a reception apparatus according to Embodiment 5 of the present invention.

FIG. 11 is a block diagram showing the configuration of reception apparatus 700 according to Embodiment 5 of the present invention.

Reception apparatus 700 according to this Embodiment 5 corresponds to reception apparatus 500 according to Embodiment 3 shown in FIG. 9 with digital signal processing section 701, GPS reception apparatus 702 and selection section 703 added, as shown in FIG. 11. In FIG. 11, the same components as those in FIG. 9 are assigned the same reference numerals and explanations thereof will be omitted.

As assumed in Embodiment 4, FIG. 11 shows the configuration of high-frequency circuit 514 when realizing a dual band reception apparatus applicable to the GSM 850 MHz band and the GSM 900 MHz band. Furthermore, as in the case of Embodiment 4, first low noise amplifier 503 is for amplification of received signals in the GSM 850 MHz band and second low noise amplifier 504 is for amplification of received signals in the GSM 900 MHz band.

This embodiment 5 will explain a method different from the method of selecting a low noise amplifier to which the received signal is not input, as explained in Embodiment 4.

A case where reception apparatus 700 receives received signals in the GSM 850 MHz band will be explained as an example.

Analog baseband circuit 511 calibrates the offset voltage of the received signal input from mixer 507a based on the control of voltage calibration circuit 509, controls the gain to a predetermined gain, and outputs the signal to digital signal processing section 701.

Analog baseband circuit 512 calibrates the offset voltage of the received signal input from mixer 507b based on the control of voltage calibration circuit 510, controls the gain to a predetermined gain, and outputs the signal to digital signal processing section 701.

Digital signal processing section 701 recovers the data signal from the received signal input from analog baseband circuits 511, 512 and displays the data on a display section (not shown) or outputs an audio signal to a speaker (not shown).

GPS reception apparatus 702 is mounted on reception apparatus 700 and outputs position information, which is information about the position where reception apparatus 700 exists, to selection section 703.

Selection section 703 stores low noise amplifier selection information (second selection information) which associates applicable frequency band information, positional relationship in which an applicable frequency band is used and a low noise amplifier provided for each applicable frequency band. Here, the positional relationship in which an applicable frequency band is used is, for example, such information that the GSM 850 MHz band and PCS 1900 MHz band are mainly used in the U.S. and GSM 900 MHz and DCS 1800 are mainly used in Europe. Using the position information input from GPS reception apparatus 702 and with reference to the low noise amplifier selection information, a low noise amplifier for a band used in a proximity cell is selected and reception time operation amplifier information is output to operation control circuit 513, and a low noise amplifier for a band not used in a proximity cell is selected and offset voltage calibration time operation amplifier information is output to operation control circuit 513. The operation of operation control circuit 513 is the same as that of above described Embodiment 4, and therefore explanations thereof will be omitted.

In this way, according to this Embodiment 5, in addition to the advantage of above Embodiment 3, it is possible to accurately select the low noise amplifier to operate during the offset voltage calibration operation. Furthermore, according to this Embodiment 5, a low noise amplifier in a band not used in nearby cells is operated, so that it is possible to calibrate the offset voltage with high accuracy even in an environment in which interferer exist.

Reception apparatuses 100, 300, 500, 600, 700 of above Embodiment 1 to Embodiment 5 can be made as a semiconductor integrated circuit apparatus having a circuit configuration (large-scale integrated circuit (LSI)) in which circuit configurations such as high-frequency circuits 114, 514 are integrated on a single semiconductor substrate.

The present application is based on Japanese Patent Application No. 2002-402231, filed on Dec. 1, 2003, the entire content of which is expressly incorporated by reference herein.

INDUSTRIAL APPLICABILITY

The reception apparatus and the reception method according to the present invention provides an advantage of enabling fast and highly accurate offset voltage calibration in an environment in which interferer exist, without causing any degradation in noise characteristics calibration and are useful in offset voltage.

The invention claimed is:

1. A receiving apparatus comprising:
an amplification section that amplifies a received signal;
a frequency conversion section that converts a frequency of the received signal, amplified by the amplification section, from a radio frequency to a baseband, the baseband having a lower frequency than the radio frequency;
a gain control section that amplifies, by a predetermined gain, the received signal, subjected to the frequency conversion to the baseband, by the frequency conversion section;
a voltage calibration section that performs calibration processing on an offset voltage generated in the received signal subjected to frequency conversion to the baseband by the frequency conversion section;
a time constant control section that sets a first time constant during a reception operation and sets a second time constant, which is reduced with respect to the first time constant, during the calibration processing;
a filter section that passes a received signal of a predetermined band with the first time constant or the second time constant; and
an operation control section that stops an operation of the amplification section during the calibration processing and controls the amplification section to operate during the reception operation, and controls the operation of the amplification section so as to reduce a residual offset voltage caused by switching the operation of the amplification section.

2. The receiving apparatus according to claim 1, wherein:
the amplification section is provided per received signal in a plurality of different bands and performs amplification processing for the different bands; and
the operation control section, during the calibration processing of the received signal subjected to frequency conversion to the baseband by the frequency conversion section, the operation control section stops the operation of the amplification section used for amplification of the received signal, in the band being subjected to reception processing, and reduces the offset voltage by performing switching so as to cause the amplification section used for amplification of the received signal, in the band not being subjected to reception processing, to operate.

3. The receiving apparatus according to claim 2, wherein the operation control section cause the amplification section used for amplification of the received signal in the band not used in a proximity cell to operate during the calibration processing.

4. The receiving apparatus according to claim 2, further comprising a storage section that stores first selection information which associates a band with the amplification section,
wherein the operation control section selects the amplification section to be stopped and the amplification section to be operated, with reference to the first selection information using information on the band reported from a communicating party.

5. The receiving apparatus according to claim 2, further comprising a storage section that stores second selection information which associates position information, the band with the amplification section,
wherein the operation control section selects the amplification section to be stopped and the amplification section to be operated, with reference to the second selection information using the position information indicating a position of the receiving apparatus.

6. The receiving apparatus according to claim 1, wherein:
the operation control section stops operation of the amplification section during the calibration processing, when the gain, upon amplification of the received signal by the gain control section, is equal to or more than a threshold value; and
the operation control section performs switching so as to cause the amplification section to operate during the calibration processing, when the gain, upon amplification of the received signal by the gain control section, is less than the threshold value.

7. The receiving apparatus according to claim 1, further comprising a detection section that detects a level of received power of the received signal subjected to frequency conversion to the baseband by the frequency conversion section, wherein:
the operation control section stops operation of the amplification section during the calibration processing, when the level of the received power detected by the detection section is equal to or more than a threshold value: and
the operation control section reduces the offset voltage by performing switching so as to cause the amplification section to operate during the calibration processing, when the level of the received power detected by the detection section is less than the threshold value.

* * * * *